US005963209A

United States Patent [19]
Hoppe

[11] Patent Number: 5,963,209
[45] Date of Patent: Oct. 5, 1999

[54] ENCODING AND PROGRESSIVE TRANSMISSION OF PROGRESSIVE MESHES

[75] Inventor: Hugues H. Hoppe, Seattle, Wash.

[73] Assignee: Microsoft Corporation, Redmond, Wash.

[21] Appl. No.: 08/586,953

[22] Filed: Jan. 11, 1996

[51] Int. Cl.[6] .................................................. G06T 17/00
[52] U.S. Cl. ........................................ 345/419; 345/428
[58] Field of Search ..................................... 395/119, 120, 395/121, 122, 123; 345/419, 425, 427, 428, 429, 430, 421, 422, 423

[56] References Cited

PUBLICATIONS

Schaufler, G., and Stuerzlinger, W., "Generating Multiple Levels of Detail for Polygonal Geometry Models," *Virtual Environments*, 53–62 (1995).
Deering, "Geometry Compression, " *Computer Graphics Proceedings*, Annual Conference Series, 13–20 (1995).
Schröder et al., "Spherical Wavelets," *Computer Graphics Proceedings*, Annual Conference Series, 161–172 (1995).
Varshney, *Hierarchical Geometric Approximations*, University Microfilms International (1994).
Eck et al., "Multiresolution Analysis of Arbitrary Meshes," *Computer Graphics Proceedings*, Annual Conference Series, 173–182 (1995).
Rossignac et al., "Multi–resolution 3D approximations for rendering complex scenes," *Modeling in Computer Graphics*, 455–465, (Springer–Verlag 1993).
Hoppe et al., "Mesh Optimization," *Computer Graphics Proceedings*, Annual Conference Series, 19–26 (1993).
Heckbert et al., "Fast Polygonal Approximation of Terrains and Heigh Fields," CMU–CS–95–181, 1–54 (Aug. 8, 1995).
Funkhouser et al., "Adaptive Display Algorithm for Interactive Frame Rates During Visualization of Complex Virtual Environments," *Computer Graphics Proceedings*, Annual Conference Series, 247–254 (1993).

Turk, "Re–Tiling Polygonal Surfaces," *Computer Graphics*, 26:2:55–64 (Jul. 1992).
Schroeder et al., "Decimation of Triangle Meshes," *Computer Graphics*, 26:2:65–70 (Jul. 1992).
Kalvin et al., "Superfaces: Polyhedral Approximation with Bounded Error," *SPIE*, vol. 2164:2–13 (1994).
Gourdon, "Simplification of Irregular Surfaces Meshes in 3D Medical Images," *Computer Vision, Virtual Reality and Robotics in Medicine*, First International Conference, CVRMed '95, Nice, France, Apr. 3–6, 1995, Proceedings, 413–419.
Hinker et al., "Geometric Optimization," *IEEE Visualization* '93, 189–195 (1993).

(List continued on next page.)

*Primary Examiner*—Cliff N. Vo
*Attorney, Agent, or Firm*—Klarquist Sparkman Campbell Leigh & Whinston, LLP

[57] ABSTRACT

An efficient, lossless, continuous-resolution representation (the "PM representation") of highly detailed geometric models for computer graphics specifies a succession of progressively more detailed polygonal meshes (i.e., "progressive meshes") as a base polygonal mesh and a sequence of complete mesh refinement transformations (e.g., the vertex split transformation) that approximate the model at progressively finer levels of detail. Procedures for storing and transmitting geometric models using the PM representation address several practical problems in computer graphics: smooth geomorphing of level-of-detail approximations, progressive transmission, mesh compression, and selective refinement. An optimized mesh simplification procedure constructs the PM representation of a model from an arbitrary polygonal mesh, while preserving the geometry of the original mesh as well as its overall appearance as defined by its discrete and scalar appearance attributes such as material identifiers, color values, normals, and texture coordinates. In particular, the PM representation and these procedures preserve discontinuity curves such as creases and material boundaries of the geometric model.

55 Claims, 20 Drawing Sheets

OTHER PUBLICATIONS

Mitchell et al., "Separation and Approximation of Polyhedral Objects," *Computational Geometry* 5:95–114 (1995).

Hamann, "A Data Reduction Scheme for Triangulated Surfaces," *Computer Aided Geometric Design* 11:197–214 (1994).

DeHaemer et al., "Simplification of Objects Rendered by Polygonal Approximations," *Computers & Graphics*, 15:2:175–184 (1991).

Taosong He et al., "Voxel Based Object Simplification," *IEEE Visualization '95*, 296–303, CP–35 (1995).

Rushmeier et al., "Geometric Simplification for Indirect Illumination Calculations," *Proceedings of Graphics Interface '93*, 227–236 (1993).

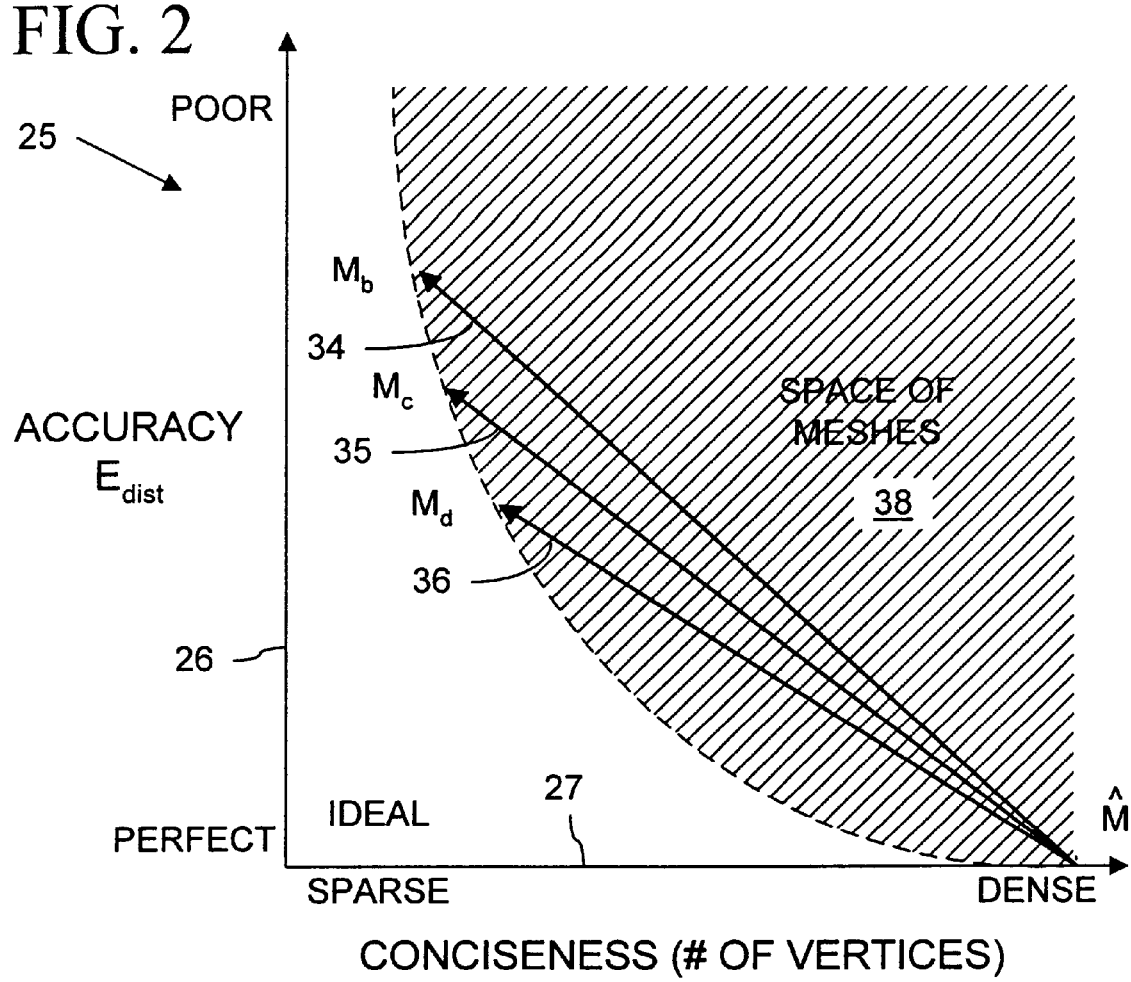

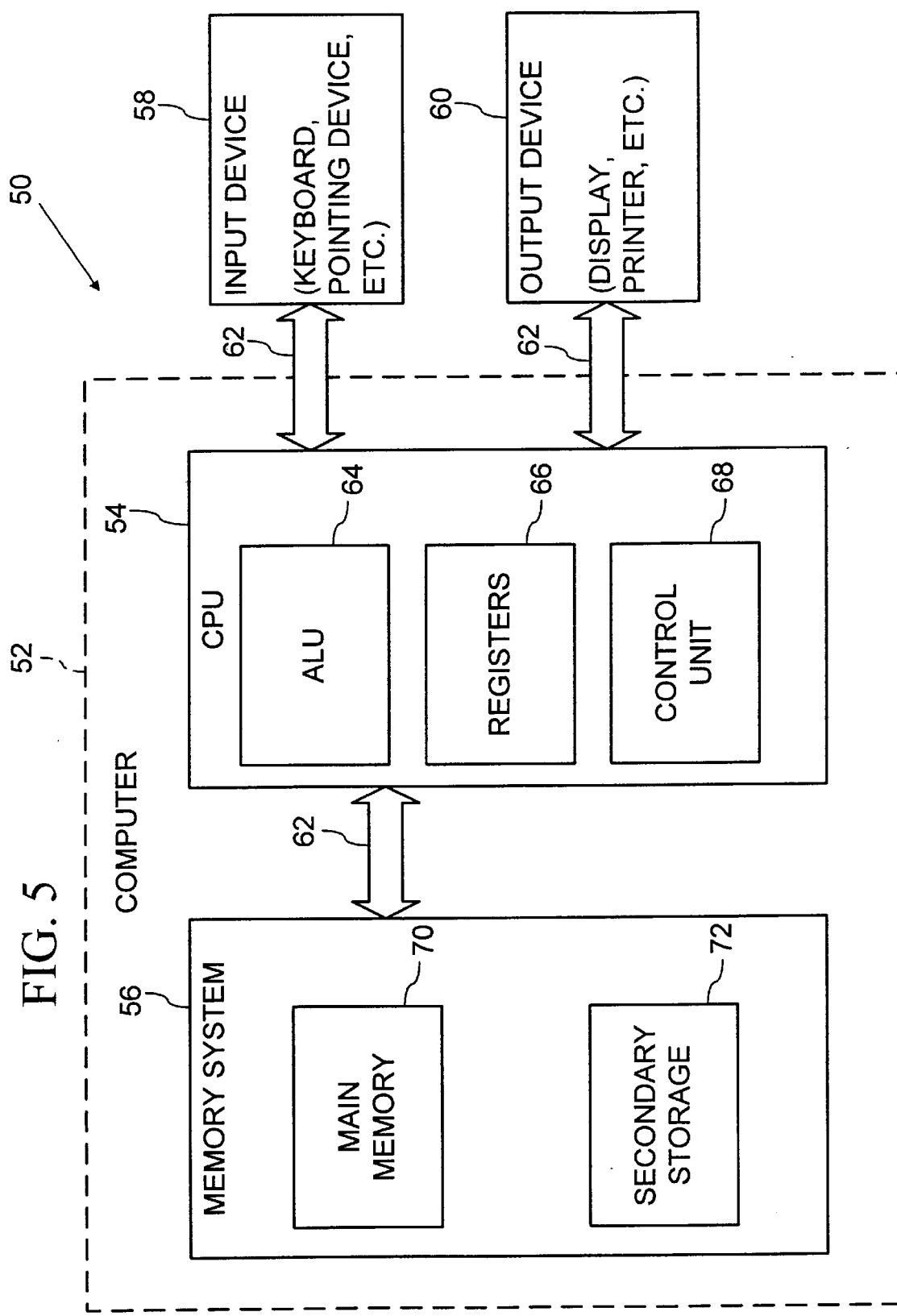

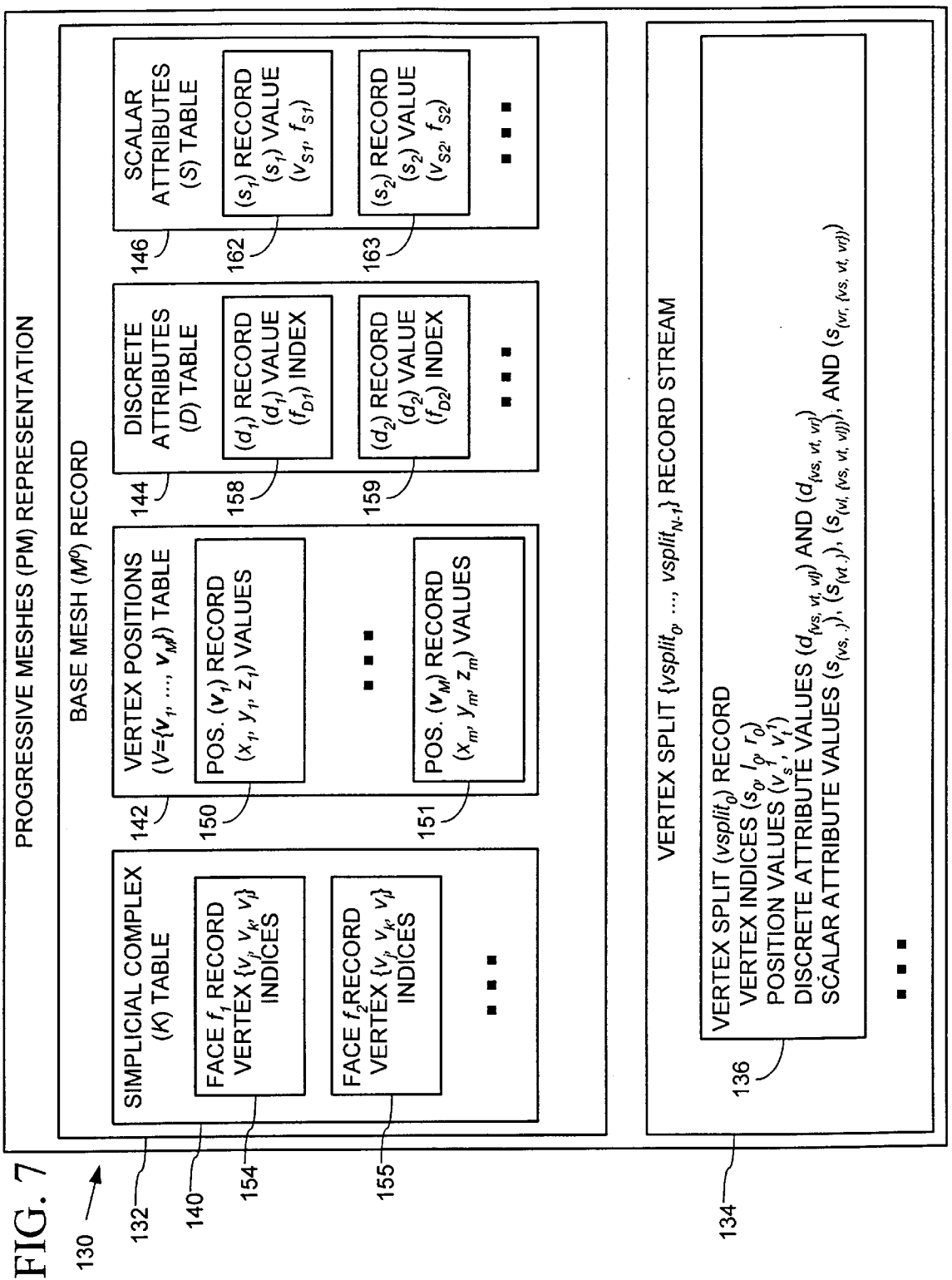

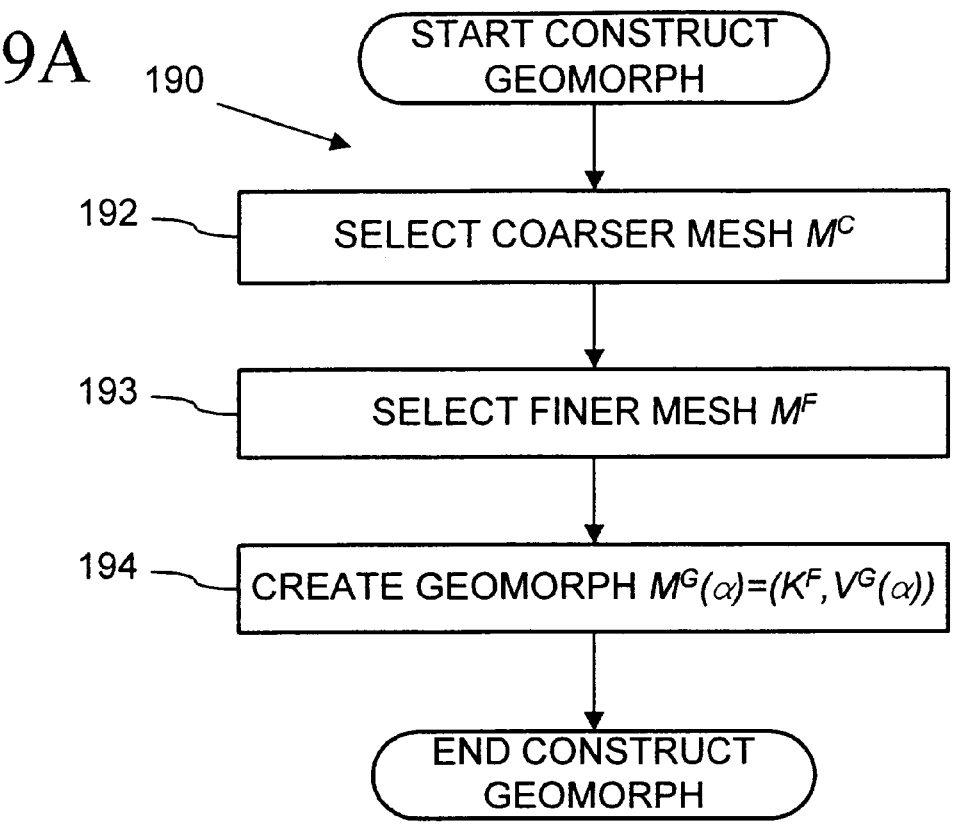

ENCODING AND PROGRESSIVE TRANSMISSION OF PROGRESSIVE MESHES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to geometric modeling using polygonal meshes for computer graphics, and more particularly relates to techniques for optimizing display, storage and transmission of varying level of detail polygonal mesh models.

BACKGROUND AND SUMMARY OF THE INVENTION

Models in computer graphics are often represented using triangle meshes. Geometrically, a triangle mesh (e.g., example portion of a triangle mesh 82 of FIG. 6) is a piecewise linear surface consisting of triangular faces joined together along their edges. In the following discussion, the geometry of a triangle mesh is denoted by a tuple (K,V), where K is a simplicial complex specifying the connectivity of the mesh simplices (i.e., the adjacency of the vertices, edges, and faces), and $V=\{v_1, \ldots, v_m\}$ is the set of vertex positions $v_j=(x_j,y_j,z_j)$ defining the shape of the mesh in $R^3$. More precisely, a parametric domain, $|K| \subset R^m$, is constructed by identifying each vertex of K with a canonical basis vector of $R^m$, and the mesh is defined as the image, $\Phi_v(|K|)$, where $\Phi_v:R^m \rightarrow R^3$ is a linear map. (See, e.g., H. Hoppe et al., *Mesh Optimization*, 1993 Computer Graphics Proceedings 19–26.) The vertices of a triangle mesh (e.g., vertices 82–89 of the mesh 80 of FIG. 6) are denoted as $v_1, \ldots, v_m$; the edges (e.g., 92–95) denoted by pairs of adjacent vertices as $e=\{v_j,v_k\}$; and the faces (e.g., faces 100–107) denoted by triples of interconnected vertices as $f=\{v_j,v_k,v_l\}$ In typical computer graphics applications, surface appearance attributes other than geometry (i.e., the above described simplicial complex and vertex positions tuple (K,V)) are also associated with the mesh. These attributes can be categorized into two types: discrete attributes and scalar attributes. Discrete attributes are usually associated with faces of the mesh. A common discrete attribute, the material identifiers determines the shader function used in rendering a face of the mesh, as well as some of the shader function's global parameters. As an example, a trivial shader function may involve simple look up within a specified texture map. (See, e.g., S. Upstill, The RenderMan Companion (Addison-Wesley 1990).)

Many scalar attributes are often associated with a mesh, including diffuse color (r,g,b), normal $(n_x,n_y,n_z)$, and texture coordinates (u,v). More generally, these attributes specify the local parameters of shader functions defined on the mesh faces. To capture discontinuities in the scalar fields, and because adjacent faces may have different shading functions, it is common to associate scalar attributes not with vertices of a mesh, but with its corners. (See, e.g., Apple Computer, Inc., 3d Graphics Programming with QuickDraw 3d (Addison-Wesley 1995).) A corner is defined as a (vertex, face) tuple. Scalar attributes $s_{(v,f)}$ at a corner $c=(v_j,f_k)$ specify the shading parameters for face f at vertex v. As an example, to model a crease (a curve on the surface across which the normal field is not smooth) one identifies a curve (sequence of edges) in the mesh; at each vertex along its path, the curve partitions the corners into two sets; two normals are associated with the vertex, one for each of these sets. A mesh with scalar and discrete surface attributes is thus denoted as a tuple M=(K,V,D,S) where D is the set of discrete attributes $d_f$ associated with the faces $f=\{v_j,v_k,v_l\} \in K$, and S is the set of scalar attributes $s_{(v,f)}$ associated with the corners (v,f) of K.

In the continuing quest for realism in computer graphics, highly-detailed geometric models are rapidly becoming commonplace. Using current modeling systems, authors can create highly detailed geometric models of objects by applying versatile modeling operations (e.g., extrusion, constructive solid geometry ("CSG"), and free-form deformations ("FFD")) to a vast array of geometric primitives (eag., non-uniform rational B-spline ("NURBS") and implicit surfaces ("Blobbies")) (See, T. Sederberg and S. Parry, *Free-form Deformation of Solid Geometric Models*, 1986 Computer Graphics Proceedings [FFD]; Rockwood, *Real-time Rendering of Trimmed Surfaces*, 1989 Computer Graphics Proceedings [NURBS]; and J. Blinn, *A Generalization of Algebraic Surface Drawing*, 1982 ACM Transactions on Graphics 1(3)235–256 [Blobbies].) For display purposes, these authored models are usually tessellated into triangle meshes of the type previously described. Detailed models can also be rapidly obtained by scanning physical objects with structured light systems, for instance laser range scanners, to also create meshes. In either case, the resulting complex meshes are expensive to store, transmit, and render, thus motivating a number of practical problems.

Mesh Simplification. The meshes created by modeling and scanning systems are typically not optimized for display performance In most applications, these initial meshes can usually be replaced by nearly indistinguishable approximations with far fewer faces, thereby improving rendering efficiency. At present, the computer user (e.g., graphical artist or designer) is often responsible for this hand-tuning of meshes, much the same way programmers tinkered with assembly code before the advent of optimizing compilers. A far better approach is to develop mesh simplification tools to automate this painstaking task. As another benefit, such tools allow porting of a single model to platforms of varying performance.

Level-of-Detail Approximation. When a detailed mesh is far from the viewer, it may occupy only a small region of the screen. Significant work must be expended to render the mesh only to have it affect a small number of pixels. Instead, a far coarser mesh (i.e., one with fewer vertices and faces) would look almost identical. To address this problem, many applications use several versions of a model at various levels of detail A fully detailed mesh is used when the object is close; coarser approximations are substituted as the object recedes. (See, T. A. Funkhouser and C. H. Sequin, *Adaptive Display Algorithm for Interactive Frame Rates During Visualization of Complex Virtual Environments*, 1993 Computer Graphics Proceedings 247–254). Further, instantaneous switching between two levels-of-detail of a given model can lead to a perceptible "popping" display effect. For this reason, the capability of constructing smooth visual transitions—called geomorphs—between meshes having different levels-of-detail is desirable.

Progressive transmission. A complex mesh consumes considerable time to transmit over a communication line, often many times longer than it takes to visually render images with views on the mesh. When a mesh is transmitted over a communication line, one would like to render views that show progressively better approximations to the model as data is incrementally received. The simplest known approach is to render the individual triangles as they are received, but of course this looks extremely poor. Another prior approach is to transmit successive level-of-detail approximations, but this requires additional transmission time.

Mesh compression. A model should be stored in the smallest amount of memory or disk space. There have been two orthogonal approaches to dealing with this problem. One is to use mesh simplification, as described earlier, to reduce the number of faces in the model as much as possible while preserving its appearance. The other is mesh compression: minimizing the space taken to store the model given that a particular mesh has been selected.

Selective refinement. When switching to a more detailed mesh of a level-of-detail representation, detail is added uniformly over the model's surface. For some models, it is desirable to refine the mesh only in selected regions. For instance, as a user flies over a terrain model, one would like to show the terrain in full detail only near the viewer, and only within the field of view.

There exist a number of mesh simplification techniques that address these problems with varying success. A technique described in G. Turk, *Re-Tiling Polygonal Surfaces*, 1992 Computer Graphics Proceedings 55–64 [hereafter "Turk92"], sprinkles a set of points on a mesh, with density weighted by estimates of local curvature, and then retriangulates based on those points.

Both W. J. Schroeder et al., *Decimation of Triangle Meshes*, 1992 Computer Graphics Proceedings 65–97 [hereafter "Schroeder-etal92"] and A. Varshney, *Hierarchical Geometric Approximations*, PhD thesis Department of Computer Science, University of North Carolina at Chapel Hill (1994) [hereafter "Varshney94" ] describe techniques that iteratively remove vertices from the mesh and retriangulate the resulting holes, The technique in Varshney94 is able to bound the maximum error of the approximation to a user-specified tolerance by defining two offset surfaces to the original mesh and using combinatorial searching.

H. Hoppe et al., *Mesh Optimization*, 1993 Computer Graphics Proceedings 19–26 [hereafter Hoppe93] describes a technique, referred to as mesh optimization, which simplifies an arbitrary original mesh by applying successive transformations selected from a set including edge collapse, edge split and edge swap so as to minimize an energy function. As shown by a graph 25 of FIG. 2 having an accuracy axis 26 and a conciseness axis 27, this energy function explicitly models the competing goals of accuracy and conciseness by sampling a dense set of points from the original mesh, and using these points to define a distance metric between a more simplified mesh resulting from a selected transformation and the original mesh.

More specifically, the goal of the mesh optimization method described in Hoppe93 is to find a mesh M=(K,V) that both accurately fits a set X of points $x_i \in R^3$ and has a small number of vertices. This problem is cast as minimization of an energy function $$E(M)=E_{dist}(M)+E_{rep}(M)+E_{spring}(M) \quad (1)$$

of accuracy and conciseness: the distance energy term $$E_{dist}(M)=E_i d^2(x_i, \Phi_v(|K|)) \quad (2)$$

measures the total squared distance of the points from the mesh (i.e., a measurement along the accuracy axis 26), and the representation energy term $$E_{crep}(M)=C_{rep}m \quad (3)$$

penalizes the number m of vertices in M (i.e., a measurement along the conciseness axis 27).

The third term, the spring energy $E_{spring}$ (M) is introduced to regularize the optimization problem. It corresponds to placing on each edge of the mesh a spring of rest length zero and tension κ:

$$E_{spring}(M)=E_{\{j,k\}\in K}\kappa\|v_j-v_k\|^2 \quad (4)$$

Hoppe93 describes minimizing the energy function E(M) using a nested optimization method having an outer loop and an inner loop. In the outer loop, the method optimizes over K, the connectivity of the mesh, by randomly attempting a set of three possible mesh transformations: edge collapse, edge split, and edge swap. This set of transformations is complete, in the sense that any simplicial complex K of the same topological type as K can be reached through a sequence of these transformations. For each candidate mesh transformation, K→K', the continuous optimization described below computes $E_{K'}$, the minimum of E subject to the new connectivity K'. If $\Delta E=E_{K'}-E_K$ is found to be negative, the mesh transformation is applied (akin to a zero-temperature simulated annealing method).

In the inner loop performed for each candidate mesh transformation, the method computes $E_{K'}=\min_V E_{dist}(V)+E_{spring}(V)$ by optimizing over the vertex positions V. For the sake of efficiency, the algorithm in fact optimizes only one vertex position $v_s$, and considers only the subset of points X that project onto the neighborhood affected by K→K'.

The regularizing spring energy term $E_{spring}$ (M) is found in Hoppe93 to be most important in the early stages of the optimization. The optimization method therefore achieves best results by repeatedly invoking the nested optimization method described above with a schedule of decreasing spring constants κ.

Hoppe93 also demonstrates use of this mesh optimization method as a mesh simplification tool. Given an initial mesh M (e.g., example initial arbitrary mesh shown in FIG. 1(*a*)) to approximate, a dense set of points X is sampled both at the vertices of M and randomly over its faces. The optimization method is then invoked with initial mesh M as the starting mesh. By varying the setting of the representation constant $C_{rep}$, the optimization method takes different paths 34–36 through a space of possible meshes 38 and thereby can produce optimized meshes $M_b$, $M_c$, and $M_d$ with different trade-offs of accuracy and conciseness. For example, FIGS. 1(*b–d*) show views of three example optimized meshes $M_b$, $M_c$, and $M_d$, respectively, produced from the example original arbitrary mesh (FIG. 1(*a*)) by the prior mesh optimization method of Hoppe93 for different values of the representation constant $C_{rep}$.

J. Rossignac and P. Borrel, *Multi-resolution 3D Approximations for Rendering Complex Scenes*, Modeling in Computer Graphics 455–465 (Springverlag, New York 1993) [hereafter "Rossignac-Borrel93"] describes a technique of merging vertices of a model using spatial binning A unique aspect of their approach is that the topological type of the model may change in the process. Their scheme is extremely fast, but since they ignore geometric qualities like curvature, their approximations are far from optimal.

The above-described mesh simplification techniques create a discrete hierarchy of simplified models by successively applying their simplification method several times. Both Turk92 and Rossignac-Borrel93 are able construct geomorphs between the discrete set of models thus created. More recently, M. Lounsbery et al., *Multiresolution analysis for surfaces of arbitrary topological type*, Technical Report 93-10-05b, (Department of Computer Science and Engineering, University of Washington, January 1994) [hereafter Lounsbery-etal94] have generalized the concept of multiresolution analysis to surfaces of arbitrary topological type. M. Eck et al., *Multiresolution Analysis of Arbitrary Meshes*, 1995 Computer Graphics Proceedings 173–182 [hereafter "Eck95"] describes how this wavelet-based multiresolution approach can be applied to the approximation of an arbitrary mesh. They first construct a parameterization of the mesh over a simple domain, and then expand that parameterization on a wavelet basis They are able to bound the maximum error between the original mesh and any approximation.

In the present invention, the above problems are addressed by methods and apparatus for storing, transmitting and rendering views of an arbitrary polygonal mesh $\underline{M}$ using a format, referred to herein as a progressive mesh ("PM") representation, that represents the arbitrary polygonal mesh as a much coarser mesh $M^0$ together with a sequence of n detail records that indicate how to incrementally refine $M^0$ exactly back into the original mesh $\underline{M}=M^n$. In an illustrated embodiment of the invention, each of these records stores information associated with a vertex split, an elementary mesh transformation that adds an additional vertex to the mesh. The PM representation of $\underline{M}$ thus defines a continuous sequence of meshes $M^0, M^1, \ldots, M^n$ of increasing accuracy from which level-of-detail approximations with any desired complexity can be efficiently retrieved. Moreover, smooth visual transitions (geomorphs) can be efficiently constructed between any two such meshes. In addition, the PM representation naturally supports progressive transmission, offers a concise encoding of $\underline{M}$ itself, and supports efficient selective refinement. In short, the PM representation offers an efficient, lossless, continuous-resolution representation.

The present invention also provides a new simplification procedure for constructing a PM representation from a given mesh $\underline{M}$. Unlike previous simplification methods, this procedure seeks to preserve not just the geometry of the mesh surface, but also its overall appearance, as defined by the discrete and scalar attributes associated with its surface Of the prior mesh simplification techniques discussed above, the multiresolution analysis (MRA) approach of Eck95 has some similarities with the PM representation. The MRA approach also stores a simple base mesh, together with a stream of information that progressively adds detail back to the model. The MRA approach likewise produces a continuous-resolution representation from which approximations of any complexity can be extracted. However, the PM representation of the present invention has a number of differences from and advantages over the prior MRA approach.

First, the MRA approach utilizes detail terms in the form of wavelets that specify transformations which recursively split the faces of a base mesh. This requires the detail terms or wavelets to lie on a domain with subdivision connectivity. As a result, each level of detail approximation, including the highest, must belong to a restricted class of meshes (those with subdivision connectivity). An arbitrary initial mesh $\underline{M}$ (with arbitrary connectivity) can only be approximately recovered to within an ε tolerance, and never exactly.

In contrast, the PM representation of the present invention is lossless. Each detail record is a complete mesh refinement transformation which can produce progressive meshes ($M^i$, i<n of the PM representation) having any arbitrary connectivity As a result, the progressive meshes can be much better approximations geometrically of the original arbitrary mesh $\underline{M}$ than the counterpart approximating meshes of the MRA approach. Furthermore, the highest-detailed model in the continuous-resolution family, $M^n$, is exactly the original arbitrary mesh $\underline{M}$. (Compare, e.g., the illustrative MRA approach meshes shown in FIGS. 4(*a–d*) to the illustrative PM representation meshes shown in FIGS. 7(*a–d*).)

Additionally, the MRA approach cannot deal effectively with surface creases (curves on the surface across which the surface is not smooth), unless those creases happen to lie parametrically along edges of the base (least level of detail) mesh The progressive meshes constructed according to the invention, however, can introduce surface creases anywhere on the mesh surface and at any of the levels-of-detail.

Additionally, the PM representation can capture both continuous, piecewise-continuous, and discrete appearance attributes associated with the surface. Such attributes include diffuse color, normals, texture coordinates, material identifiers, and shader parameters. To represent functions with discontinuities, prior MRA schemes can use piecewise-constant basis functions, but then the resulting approximations have too many discontinuities since none of the basis functions meet continuously. (See, e.g., P. Schroder and W. Sweldens, *Spherical Wavelets: Efficiently Representing Functions on the Sphere*, 1995 Computer Graphics Proceedings 161-172 (the Haar wavelet basis).) Furthermore, it is not presently clear how MRA could be extended to capture discrete attributes.

Finally, the PM representation of the invention allows geomorphs between any two levels-of-detail meshes with different discrete attributes. This is not possible with prior MRA approaches.

Additional features and advantages of the invention will be made apparent from the following detailed description of an illustrated embodiment which proceeds with reference to the accompanying drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Certain of the drawings executed in color are images of meshes created from a dataset entitled Cessna which was originally created by Viewpoint Datalabs International, Inc. of Orem, Utah, U.S.A.

FIG. 1(*c*) with $c_{rep}=10^{-5}$ and 370 faces; and FIG. 1(*d*) with $c_{rep}=10^{-7}$ and 1194 faces) produced according to a prior mesh optimization method described in Hoppe93.

FIG. 2 is a graph of accuracy versus conciseness illustrating the results of the prior mesh optimization method described in Hoppe93 for the example approximating meshes shown in FIGS. 1(*b–d*).

FIG. 5 is a block diagram of a computer system that can be used to implement a method and apparatus embodying the invention for storing, transmitting and rendering views on progressive meshes using a PM representation.

FIG. 7 is a block diagram of a PM representation data structure for representing a succession of level-of-detail approximations of an arbitrary original mesh M according to the illustrated embodiment of the invention.

FIG. 9(a) is a flow diagram of a method for creating geomorphs between two meshes in a PM representation according to the illustrated embodiment.

FIGS. 25(a–c) are views of exemplary simplified meshes (each with 2000 faces) produced according to variations of the simplification method of FIG. 19 (FIG. 25(a) without $E_{disc}$.

DETAILED DESCRIPTION OF THE ILLUSTRATED EMBODIMENTS

Figures 1A, 1B, 1C, 1D:
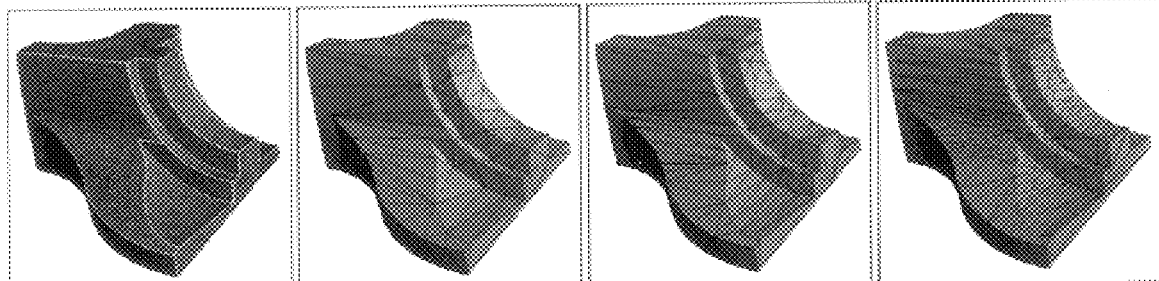
FIGS. 1(*a–d*) are views of an arbitrary mesh (FIG. 1(*a*) with 12,946 faces) and a set of simplified approximating meshes at multiple levels of detail (FIG. 1(*b*) with $c_{rep}=10^{-4}$ and 228 faces.
Figures 4A, 4B, 4C, 4D:
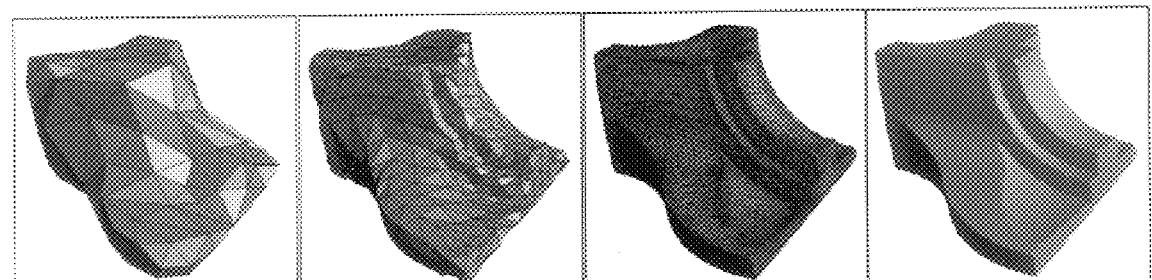
FIGS. 4(*a–d*) are views of a set of meshes (with 192 faces and ε=9.0 tolerance (FIG. 4(*a*)); 1,070 faces and ε=2.75 tolerance (FIG. 4(*b*); and 15,842 faces and ε=0.1 tolerance (FIGS. 4(*c–d*))) constructed according to the prior MRA approach to approximate an original arbitrary mesh M and illustrating that, in comparison with the meshes constructed by the illustrated embodiment of the invention which are shown in FIGS. 8(a–d), the prior MRA approach does not recover the arbitrary mesh M exactly, cannot deal effectively with surface creases, and produces inferior quality level-of-detail approximations of the arbitrary mesh M.

Referring to FIG. 5, an operating environment for an illustrated embodiment of the present invention is a computer system 50 with a computer 52 that comprises at least one high speed processing unit (CPU) 54, in conjunction with a memory system 56, an input device 58, and an output device 60. These elements are interconnected by at least one bus structure 62.

The illustrated CPU 54 is of familiar design and includes an ALU 64 for performing computations, a collection of registers 66 for temporary storage of data and instructions, and a control unit 68 for controlling operation of the system 50. The CPU 54 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 56 generally includes high-speed main memory 70 in the form of a medium such as random access memory (RAM) and read only memory (ROM) semiconductor devices, and secondary storage 72 in the form of long term storage mediums such as floppy disks, hard disks, tape, CD-ROM, flash memory, etc. and other devices that store data using electrical, magnetic, optical or other recording media. The main memory 70 also can include video display memory for displaying images through a display device. Those skilled in the art will recognize that the memory 56 can comprise a variety of alternative components having a variety of storage capacities.

The input and output devices 58, 60 also are familiar. The input device 58 can comprise a keyboard, a mouse, a physical transducer (e.g., a microphone), etc. The output device 60 can comprise a display, a printer, a transducer (e.g., a speaker), etc. Some devices, such as a network interface or a modem, can be used as input and/or output devices.

As is familiar to those skilled in the art, the computer system 50 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 56.

In accordance with the practices of persons skilled in the art of computer programming, the present invention is described below with reference to acts and symbolic representations of operations that are performed by computer system 50, unless indicated otherwise. Such acts and operations are sometimes referred to as being computer-executed. It will be appreciated that the acts and symbolically represented operations include the manipulation by the CPU 54 of electrical signals representing data bits which causes a resulting transformation or reduction of the electrical signal representation, and the maintenance of data bits at memory locations in memory system 56 to thereby reconfigure or otherwise alter the computer system's operation, as well as other processing of signals. The memory locations where data bits are maintained are physical locations that have particular electrical, magnetic, or optical properties corresponding to the data bits. The term "specify" is sometimes used herein to refer to the act of encoding data bits as representations of physical objects, activities, properties or characteristics, and relationships.

Overview of Meshes.

Figure 6:
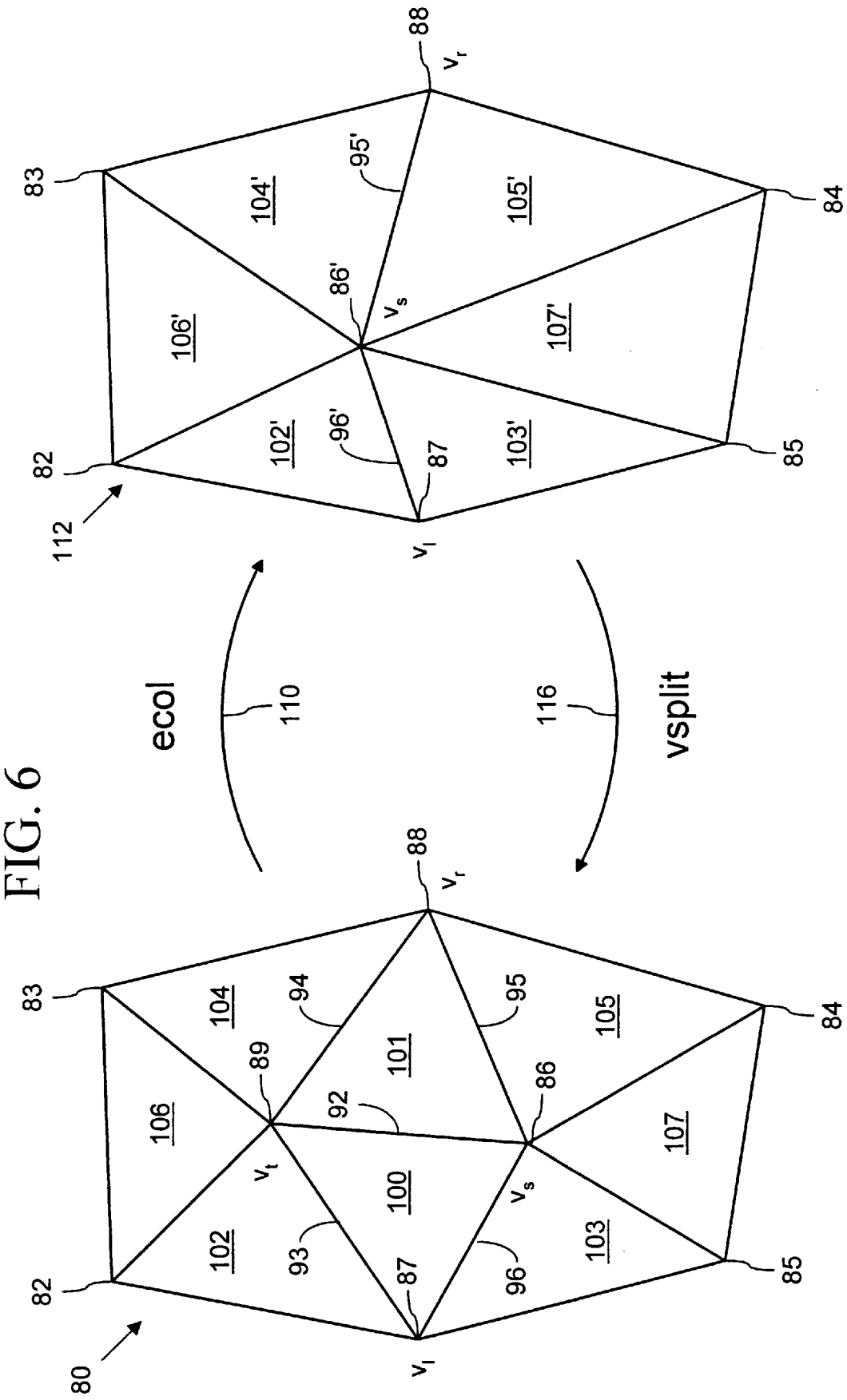
FIG. 6 is a block diagram of portions of example initial and resulting triangle meshes illustrating two inverse mesh transformations, an edge collapse operation and a vertex split operation.

Referring now to FIG. 6, the computer system 50 (FIG. 5) utilizes a progressive mesh ("PM") representation to model three dimensional objects for graphics imaging as polygonal meshes at varying levels of detail. For simplicity, the PM representation in the illustrated embodiment operates on triangle meshes (see, discussion in the "Background and Summary of the Invention" above). The PM representation of the illustrated embodiment can operate with more general meshes, such as those containing n-sided faces and faces with holes, by first converting the more general mesh into a triangle mesh using conventional triangulation processes (e.g., edges are added to subdivide polygonal faces of the mesh having more than 3 sides into triangle faces). Alternatively, edge collapse transformations (described below) can be applied to the sides of polygonal faces having more than three sides to produce a triangle mesh. It should also be recognized that the PM representation can be generalized in alternative embodiments of the invention to operate directly with more general meshes (i.e., without prior triangulation), at the expense of more complex data structures Overview of Progressive Mesh Representation.

Referring again to FIGS. 1 and 2, Hoppe93 (see, Background and Summary of the Invention above) describes a mesh optimization method that can be used to approximate an initial mesh $\underline{M}$ by a much simpler one. This mesh optimization method traverses the space of possible meshes (as discussed above with reference to the graph of FIG. 2) by successively applying a set of 3 mesh transformations: edge collapse, edge split, and edge swap.

With reference to FIG. 6, the inventor has since discovered that in fact a single one of those transformations, edge collapse denoted herein as ecol ($\{v_s,v_t\}$), is sufficient for the effective simplification of a mesh. To illustrate, an edge collapse transformation 110 unifies 2 adjacent vertices $v_s$ 86 and $v_t$ 89 of the mesh 80 into a single vertex $v_s$ 86' to form a resulting simpler mesh 112. The vertex $v_t$ 89 and the two adjacent faces $\{v_s,v_t,v_l\}$ 100 and $\{v_s,v_t,v_r\}$ 101 of the original mesh 80 vanish in the process. A position $v_s$ is specified for the new unified vertex 86'.

Thus, an initial mesh $\underline{M}=M^n$ can be simplified (such as by the mesh simplification method described more fully below) into a coarser mesh $M^0$ by applying a sequence of n successive edge collapse transformations:

$$(\underline{M}=M^n) \; \text{ecol}_{n-1} \rightarrow M^{n-1} \ldots \text{ecol}_1 \rightarrow M^1 \; \text{ecol}_0 \rightarrow M^0 \qquad (5)$$

The particular sequence of edge collapse transformations must be chosen carefully, since it determines the quality of the approximating meshes $M^i$, i<n. Where $m_0$ is the number of vertices in $M^0$, the vertices of mesh $M^i$ are labeled herein as $V^i=\{v_1, \ldots, v_{m0+i}\}$, so that vertex $v_{m0+i+1}$ is removed by $\text{ecol}_i$. As vertices may have different positions in the different meshes, the position of $v_j$ in $M^i$ is denoted herein as $v_j^i$.

A key observation is that an edge collapse transformation is invertible The inverse transformation is herein referred to as a vertex split 116. A vertex split transformation, denoted herein as vsplit($v_s,v_l,v_r,v_t,A$), adds near vertex $v_s$ 86' a new vertex (i.e., previously removed vertex $v_t$ 89) and two new faces (i.e., previously removed faces $\{v_s,v_t,v_l\}$ 100 and $\{v_s,v_t,v_r\}$ 101) according to the two side vertices $v_1$ 87 and $v_r$ 88. (If the edge $\{v_s,v_t\}$ 92 is a boundary edge, then $v_r$=0 and only one face is added.) The transformation also updates the attributes of the mesh in the neighborhood of the transformation. This attribute information, denoted by A, includes the positions $v_s$ and $v_t$ of the two affected vertices, the discrete attributes $d_{\{vs,vt,vl\}}$ and $d_{\{vs,vt,vr\}}$ of the two new faces, and the scalar attributes of the affected corners ($s_{(vs,\cdot)}$, $s_{(vt,\cdot)}$, $s_{(vl,\{vs,vt,vl\})}$, and $s_{(vr,\{vs,vt,vr\})}$).

Referring to FIG. 7, because edge collapse transformations are invertible, an arbitrary triangle mesh $\underline{M}$ therefore can be represented according to the illustrated embodiment of the invention as a data structure 130 containing a base mesh record 132 specifying the simple mesh $M^0$ (hereafter the "base mesh"), together with a sequence 134 of n vsplit records 136 specifying a sequence of vertex split transformations that reconstruct the arbitrary mesh $\underline{M}$ from the base mesh $M^0$:

$$M^0 \; \text{vsplit}_0 \rightarrow M^1 \; \text{vsplit}_1 \rightarrow \ldots \text{vsplit}_{n-1} \rightarrow (M^n=\underline{M}) \qquad (6)$$

where the vsplit records are parameterized as $\text{vsplit}_i(s_i,l_i,r_i,A_i)$. The data structure ($M^0$, $\{\text{vsplit}_0, \ldots, \text{vsplit}_{n-1}\}$) 130 is referred to herein as a progressive mesh (PM) representation of the arbitrary mesh $\underline{M}$.

A significant property (referred to herein as "completeness") of the vertex split transformation is that a mesh with any arbitrary simplicial complex KA can be constructed from a mesh with a minimal simplicial complex $K^M$ of the same topological type by a sequence of one or more of the transformations. (The four to one face split transformation used in the prior MRA approach discussed above is not complete in this sense because a sequence of these face split transformations can only construct an approximation to any arbitrary mesh from a minimal mesh of the same topological type having subdivision connectivity.) Because the vertex split transformation is complete in this sense, any arbitrary mesh can be reprented exactly using the illustrated PM representation Similarly, a set of one or more mesh transformations also is complete if a mesh having any arbitrary simplicial complex $K^A$ can be constructed from a minimal simplicial complex $K^M$ of the same topological type by a sequence of transformations from the set. Accordingly, although vertex split transformations are specified in the sequence of records in the PM representation of the illustrated embodiment, the records in a PM representation can alternatively specify a set of mesh transformations that is complete other than the vertex split transformation. For example, a set including the 4-to-1 face split transformation plus a vertex split transformation is complete and can be specified in the sequence of records in a PM representation of an alternative embodiment of the invention.

In the PM representation 130 of the illustrated embodiment, the base mesh record 132 comprises a simplicial complex table 140, a vertex positions table 142, a discrete attributes table 144, and a scalar attributes table 146 which contain information of the tuple $M^0=(K^0, V^0, D^0, S^0)$ that defines the base mesh $M^0$. The vertex positions table 142 contains $m^0$ position records 150–151 for each vertex of the base mesh $M^0$ with that vertex's coordinate values (xry,z). In the illustrated vertex positions table 142, the position records 150–151 are indexed according to vertex indices associated with the indices of the base mesh $M^0$.

The simplicial complex table 140 contains face records 154–155 for each face in the base mesh $M^0$ with the indices of that face's vertices $\{v_j, v_k, v_l\}$. This vertex information in the face records explicitly defines each face of the base mesh $M^0$, and also implicitly defines the edges and corners of the base mesh $M^0$. In alternative embodiments, the base mesh record 132 can contain information which explicitly defines the edges and corners, such as records containing indices of pairs of adjacent vertices to define the edges and records containing indices of vertex index, face index tuples to define the corners In the illustrated simplicial complex table, the face records 154–155 are indexed according to face indices associated with the faces of the base mesh $M^0$.

The discrete attributes table 144 contains records 158–159 with information (i.e., an attribute value and a face index) that defines the discrete attributes associated with the faces of the base mesh $M^0$. The scalar attributes table 146 contains records 162–164 with information (i.e., an attribute value and a vertex index, face index tuple) that define scalar attributes associated with corners of the base mesh $M^0$. Although illustrated with a single discrete attributes table 144 and a single scalar attributes table 146, the base mesh record 132 can contain separate attributes tables for each of multiple different discrete and scalar attributes (e.g., material identifies, shader function parameters, diffuse color, normal, texture coordinates, etc.) of the base mesh $M^0$.

The vertex split records 136 in the sequence 134 specify vertex split transformations that reconstruct the arbitrary original mesh $\underline{M}$ from the base mesh $M^0$. In general, the information in each of the vertex split records comprises indices of the vertices $v_s$ 86, $v_l$, 87 and $v_r$ 88 (FIG. 6); the position coordinates $v_s''$ and $v_t''$ of the vertices $v_s$ 86 and $v_t$ 89 (FIG. 6); the discrete attributes and $d_{\{vs,vt,vl\}}$ and $d_{\{vs,vt,vr\}}$ of faces 100 and 101 (FIG. 6); and the scalar attributes $s_{(vs,..)}$, $s_{(vt,..)}$, $s_{(vl,\{vs,vt,vl\})}$, and $s_{(vr,\{vs,vt,vr\})}$ of the corners of the faces 100 and 101. In alternative embodiments, the vertex split records can specify the vertices $v_s$, $v_l$, and $v_r$ indirectly, such as by the index of a neighboring face (e.g., one including the vertices $v_s$ and $v_l$) and bits identifying the vertexes from those adjacent that face (e.g., identifying $v_s$ and $v_l$ mout of the face's vertices, and identifying $v_r$ out of the vertices neighboring the face).

Figures 8A, 8B, 8C, 8D:
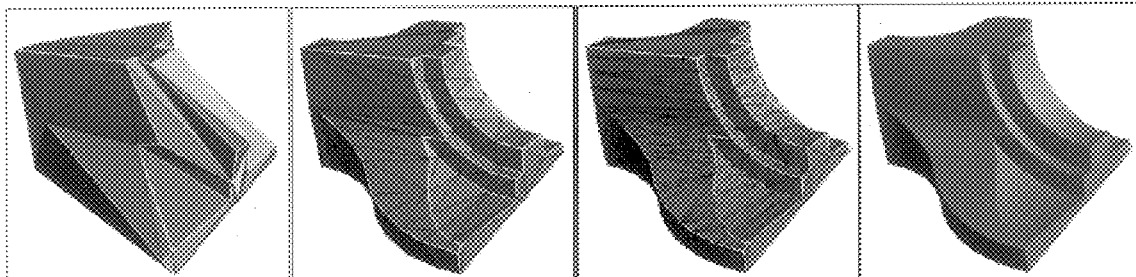
FIGS. 8(a–d) are views of three exemplary meshes ($M^0$ with 50 faces in FIG. 8(a); $M^{75}$ with 200 faces in FIG. 8(b); and 475 with 1000 faces in FIGS. 8(c–d)) out of a set of progressive meshes specified in an exemplary PM representation according to the illustrated embodiment of the invention.

As an example with reference to FIGS. 8(a–d), the example initial arbitrary mesh $\underline{M}$ of FIG. 1(a) (with 12,946 faces) was simplified down to the coarse mesh $M^0$ 170 of FIG. 8(a) (with 50 faces) using 6448 edge collapse transformations The PM representation of $\underline{M}$ (FIG. 1(a)) consists of a base mesh record specifying $M^0$ together with a sequence of n=6448 vsplit records From this PM representation, one can extract approximating meshes with any desired number of faces within ±1 by applying to $M^0$ a prefix of the vsplit sequence. For example, FIGS. 8(b–d) shows two approximating meshes with 200 and 1000 faces out of the progressive meshes sequence.

In the illustrated embodiment, the data structure of the PM representation 130 described above where the simplicial complex table 140 lists face records 154–155 containing the vertex indices of each face is used for storage purposes (e.g., storage of the progressive meshes on the hard disk of the computer system 50 of FIG. 5). At run time, the illustrated embodiment utilizes an edge based data structure for the simplicial complex table 140 to also encode the adjacency of faces. This allows for efficient processing of queries, such as which faces are adjacent to face $f_j$, and which faces are adjacent to vertex $v_j$. Suitable edge based data structures are well known, and include the winged-edge data structure described in K. Weiler, *Edge-based Data Structures for Solid Modeling in Curved-surface Environments*, IEEE CG&A 5(1):21–40 (January 1985).

In some alternative embodiments of the invention, the vertex split records 136 can encode information to specify the attributes of the mesh both before and after the vertex split transformation is applied. This allows traversal of the progressive meshes sequence in both directions. In other words, a given mesh in the progressive mesh sequence can be either further refined by applying vertex split transformations specified in subsequent (not yet applied) vertex split records, or the mesh can be simplified by reversing the vertex split transformations specified in preceding (previously applied) vertex split records as desired. At a minimum, the added information specifies the vertex position $v_s$ in the mesh before the vertex split transformation is applied. Other attributes of the faces 102'–107' (FIG. 6) and corners that are present before the vertex split transformation is applied also can be encoded in the vertex split records if they are changed by the vertex split transformation.

Geomorphs.

A beneficial property of the vertex split transformation (and its inverse, edge collapse) is that a smooth visual transition (a geomorph) can be created between the two meshes $M^i$ and $M^{i+1}$ in $M^i$ vsplit$_i \rightarrow M^{i+}$. With the assumption that the meshes contain no attributes other than vertex positions, the vertex split records 136 (FIG. 7) are each encoded as vsplit$_i$(s$_i$,l$_i$,r$_i$,A$_i$=(v$_{si}^{i+1}$,v$_{m0+i+1}^{i+1}$)), where s$_i$, l$_i$, r$_i$ are the indices of the vertices $v_{si}$, $v_{li}$, and $v_{ri}$, respectively. (In other words, the vertex split record 136 contains the vertex indices and position values, but not the discrete and scalar attribute values shown in FIG. 7.) A geomorph $M^G(\alpha)$ is created with blend parameter $0 \leq \alpha \leq 1$, such that $M^G(0)$ looks like $M^i$ and $M^G(1)$ looks like $M^{i+1}$—in fact $M^G(1) = M^{i+1}$—by defining a mesh $$M^G(\alpha) = (K^{i+1}, V^G(\alpha)) \tag{7}$$

whose connectivity is that of $M^{i+1}$ and whose vertex positions linearly interpolate from $v_{si} \in M^i$ to the split vertices $v_{si}, v_{m0+i+1} \in M^{i+1}$:

$$v_j^G(\alpha) = \begin{cases} (\alpha)v_j^{i+1} + (1-\alpha)v_{si}^i, & j \in \{s_i, m_0+i+1\} \\ v_j^{i+1} = v_j^i, & j \notin \{s_i, m_0+i+1\} \end{cases} \quad (8)$$

Using such geomorphs, an application can smoothly transition from a mesh $M^i$ to meshes $M^{i+1}$ or $M^{i+1}$ without any visible "snapping" of the meshes, by varying the value of $\alpha$.

Moreover, since each individual vsplit/ecol transformation can be transitioned smoothly, so can the composition of any sequence of them. Thus, given any two meshes, a coarser mesh $M^c$ and a finer mesh $M^f$, $0 \leq c < f \leq n$, in the sequence of meshes $M^0 \ldots M^n$ encoded by the PM representation, a smooth geomorph $M^G(\alpha)$ can be defined such that $M^G(0)$ looks like $M^c$ and $M^G(1)$ equals $M^f$. To obtain $M^G$, each vertex $v_j$ of $M^f$ is associated with its ancestor in $M^c$; the index $A^c(j)$ of this ancestor vertex is found by recursively backtracking through the vsplit transformations that led to the creation of $v_j$:

$$A^c(j) = \begin{cases} j, & j \leq m_0 + c \\ A^c(s_{j-m0-1}), & j > m_0 + c \end{cases} \quad (9)$$

(In practice, this ancestor information $A^c$ is gathered in a forward fashion as the mesh is refined.) The geomorph $M^G(\alpha)$ is defined by $M^G(\alpha) = (K^f, V^G(\alpha))$ to have the connectivity of $M^f$ and the vertex positions $$v_j^G(\alpha) = (\alpha)v_j^f + (1-\alpha)v_{AC(j)}^c \quad (10)$$

So far, the above discussion has outlined the construction of geomorphs between PM meshes containing only position attributes. In fact, geomorphs can be constructed for meshes containing both discrete and scalar attributes.

Discrete attributes by their nature cannot be smoothly interpolated. Fortunately, these discrete attributes are associated with faces of the mesh, and the "geometric" geomorphs described above smoothly introduce faces. In particular, observe that the faces of $M^c$ are a proper subset of the faces of $M^f$, and that those faces of $M^f$ missing from $M^c$ are invisible in $M^G(0)$ because they have been collapsed to degenerate (zero area) triangles. Thus, as $\alpha$ is varied from 0 to 1, these triangles grow from zero area triangles in $M^G(0)$ to their full size in $M^G(1) = M^f$. Prior geomorphing schemes (such as those described in J. M. Lounsbery, *Multiresolution Analysis for Surfaces of Arbitrary Topological Type*, PhD thesis, Department of Computer Science and Engineering, University of Washington, (1994); Lounsbery-etal94; and Turk92} define well-behaved (invertible) parametrizations between meshes at different levels-of-detail. Such parametrizations do not permit the construction of geomorphs between meshes with different discrete attributes. In contrast, geomorphs of the PM representation meshes define non-invertible maps from $M^f$ to $M_c$, in which all faces of $M^f$ missing from $M^c$ are mapped to edges or vertices of $M^c$. This mapping makes a smooth visual transition of meshes with discrete attributes possible.

Scalar attributes defined on corners also can be smoothly interpolated much like the vertex positions. There is a slight complication in that a corner (v,f) present in a mesh $\underline{M}$ cannot be associated with any "ancestor corner" in a coarser mesh $M^c$ if f is not a face of $M^c$. The attribute value that the corner (v,f) would have in $M^c$ can be inferred by examining the mesh $M^{i+1}$ in which f is first introduced, locating a neighboring corner (v,f) in $M^{i+1}$ whose attribute value is the same, and recursively backtracking from it to a corner in $M^c$. If there is no neighboring corner in $M^{i+1}$ with an identical attribute value, then the corner (v,f) has no equivalent in $M^c$ and its attribute is therefore kept constant through the geomorph.

The interpolating function on the scalar attributes need not be linear; for instance, normals are best interpolated over the unit sphere, and colors may be best interpolated in Hue-Saturation-Value ("HSV") space (although, in the illustrated embodiment, colors are interpolated in Red-Green-Blue ("RGB") space for efficiency).

The interpolating function for vertex positions also need not be linear. In some embodiments of the invention for example, the vertex positions of the geomorph can be defined as $$v^G(\alpha) = (a(\alpha))v^f + (1-a(\alpha))v^c,$$

where the function $a(\alpha) = 0.5 + 0.5 \sin((\alpha - 0.5)\pi)$ (i.e., a non-linear function in $\alpha$ as opposed to a linear function such as $a(\alpha) = \alpha$). This non-linear function $a(\alpha)$ provides interpolation for $0 \leq \alpha \leq 1$, but has a zero valued derivative at 0 and 1. This results in a slow-in, slow-out interpolation behavior.

Figure 9B:
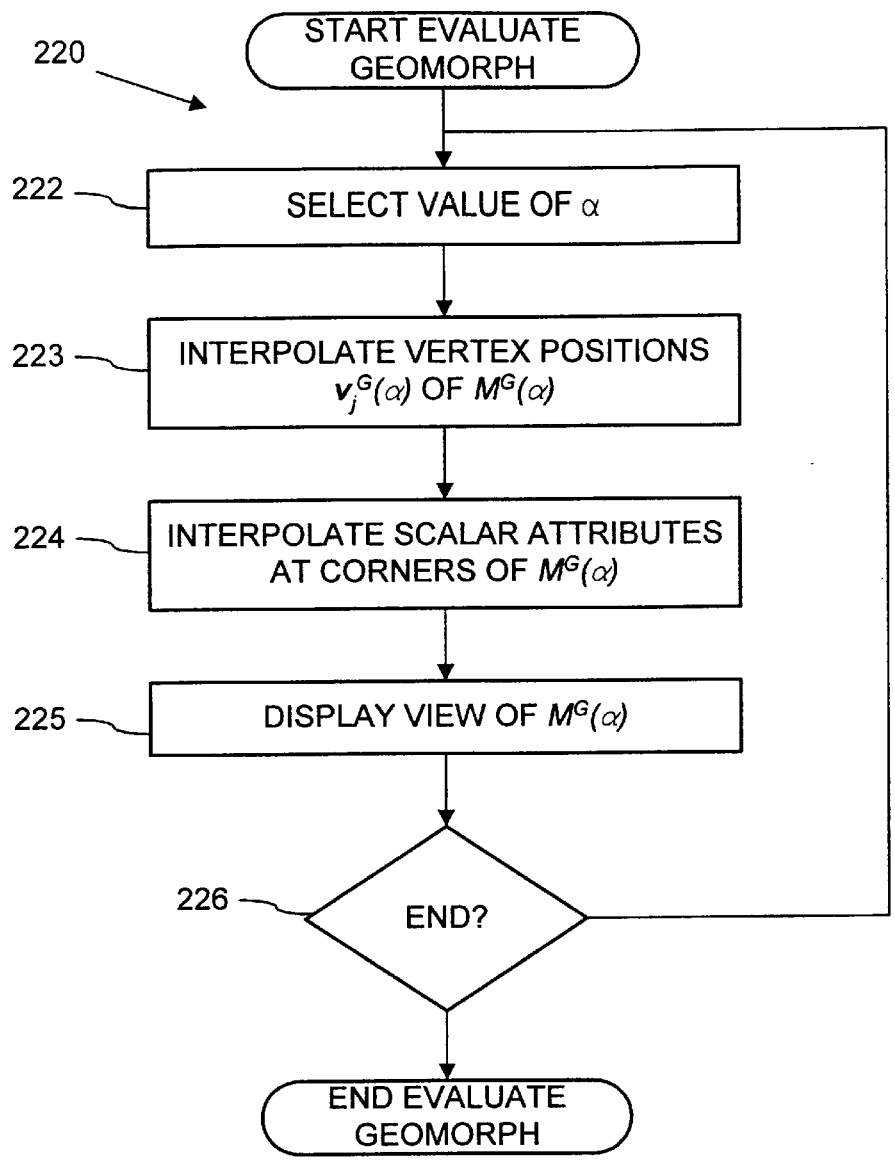
FIG. 9(b) is a flow diagram of a method for evaluating the geomorphs created by the method of FIG. 9(a).

Referring to FIG. 9(a), the illustrated computer system 50 (FIG. 5) performs a method 190 for constructing geomorphs to display smooth transitions between any two progressive meshes in a PM representation. The method 190 can be implemented as a module of code, which for example forms a component of a software application run on the computer system 50 to display 3D graphics. The method 190 generally is a preprocess for the geomorph evaluation and display method shown in FIG. 9(b).

Figure 3:
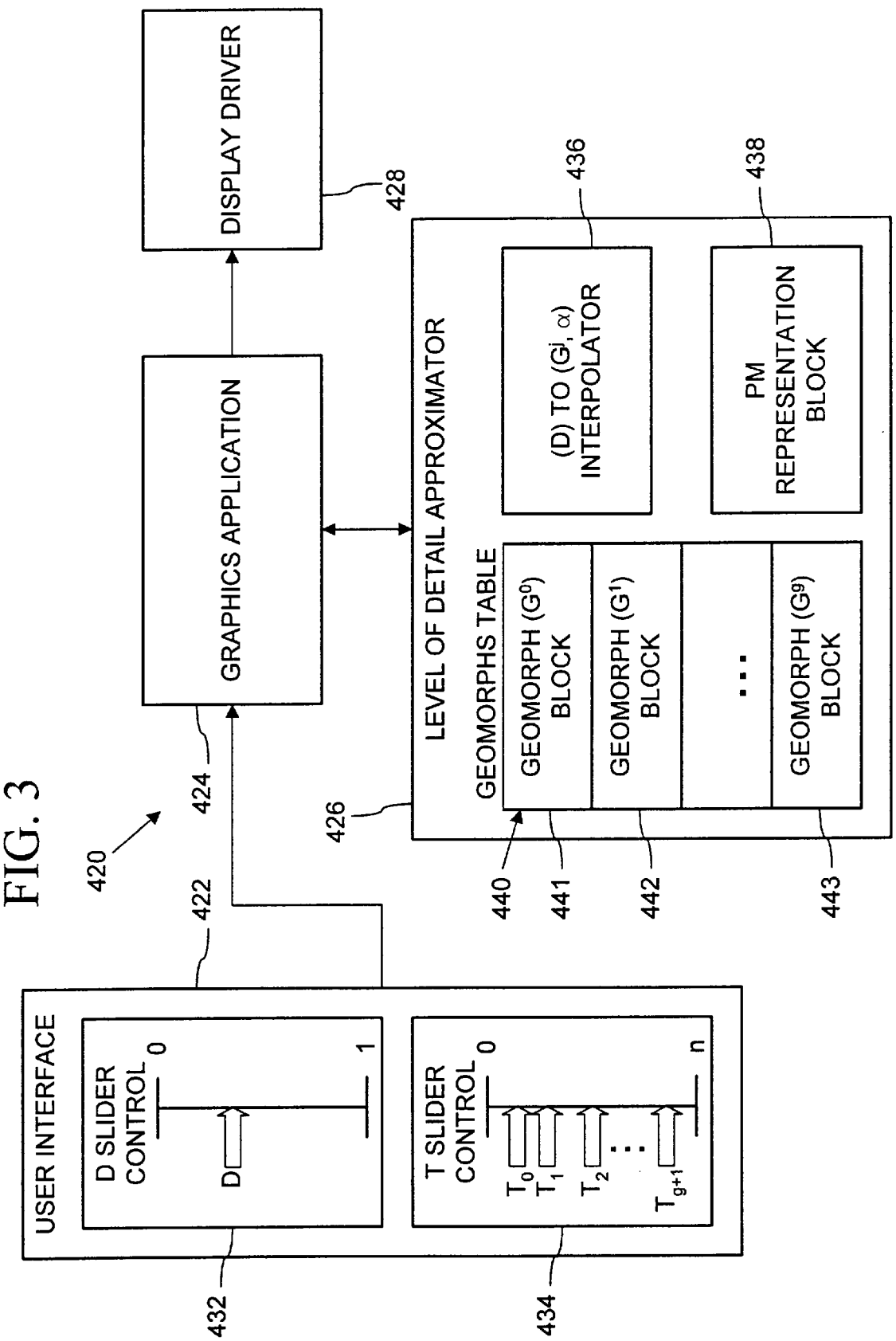
FIG. 3 is a block diagram of a software system for viewing level of detail approximations of a mesh according to the illustrated embodiment of the invention.

The method 190 begins at steps 192–193 with selecting the coarser mesh $M_C$ and finer mesh $M_F$ out of successive level of detail meshes specified in a PM representation. This selection can be made by the software application itself. For example, when transitioning between level-of-detail approximations due to a change in viewing distance, the software application selects the coarser and finer meshes to correspond to the starting and ending level-of-detal approximations Alternatively, the software application can provide user interface controls (e.g., a value entry box, or a list selection box) for selection of the coarser and finer meshes by the computer user. FIG. 3, described below, illustrates a software system with user interface controls for selecting the coarser and finer meshes.

With the finer and coarser meshes selected, the computer system 50 creates a geomorph $(M^G(\alpha) = (K^F, V^G(\alpha)))$ with a connectivity $(K^F)$ equal to that of the selected finer mesh at step 194. The positions of the vertices of the geomorph vary between their position in the coarser mesh to their position in the finer mesh according to the value of the blend parameter $\alpha$. At step 195, the discrete attributes associated with the faces of the selected finer mesh are then mapped to the corresponding faces of the geomorph.

Figure 26:
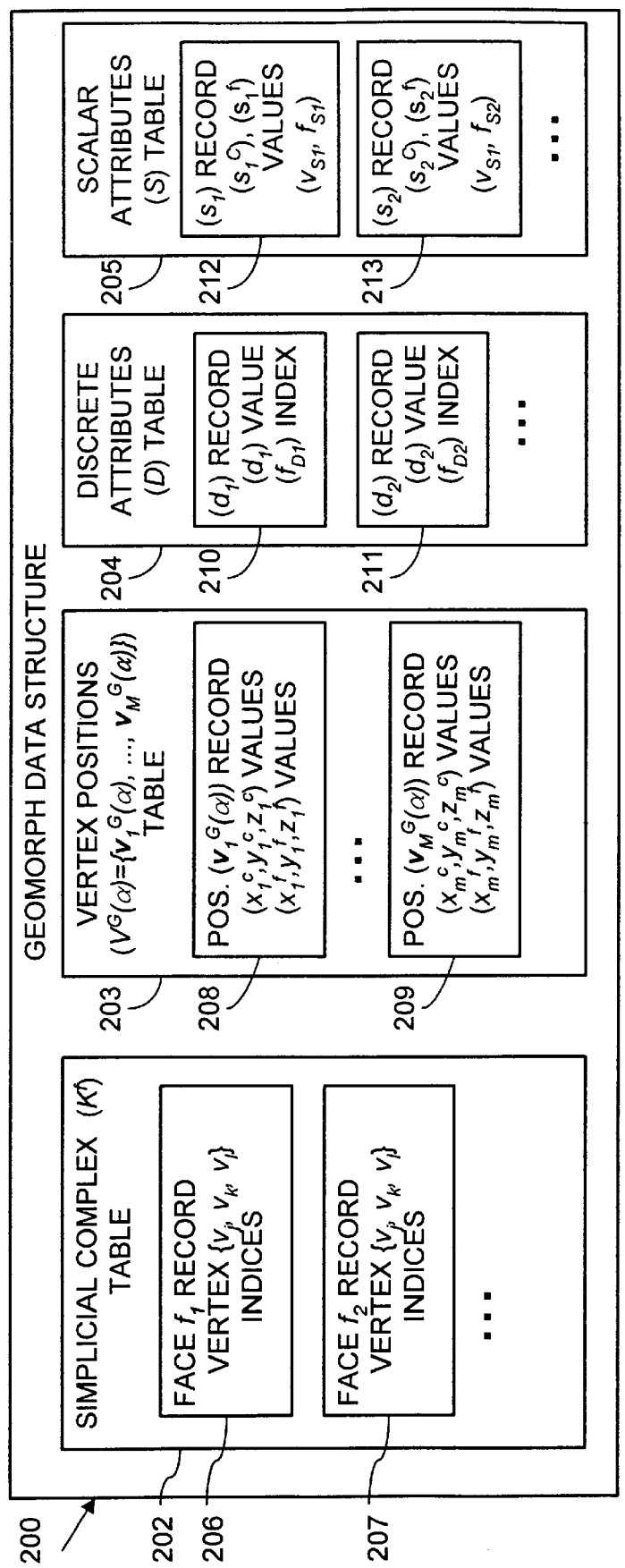
FIG. 26 is a block diagram of a geomorph data structure for representing a geomorph between two meshes of the PM representation of FIG. 7 which is constructed according to the geomorph construction method of FIG. 9(a).

Referring to FIG. 26, the geomorph created by the method 190 preferably is realized as a geomorph data structure 200 (with some similarities to that of the base mesh record 132 (FIG. 7)) that can be stored in the memory system 56 of the illustrated computer system 50 (FIG. 5). The illustrated geomorph data structure 200 comprises a simplicial complex table $K^f$ table 202, a vertex positions $V^G(\alpha) = \{v_1^G(\alpha), \ldots, v_M^G(\alpha)\}$ table 203, a discrete attributes table 204, and a scalar attributes table 205. The simplicial complex table 202 comprises face records 206–207 representing the faces of the geomorph. As in the simplicial complex table 140 of the illustrated PM representation 130 (FIG. 7), the face records 206–207 encode indices of the three vertices $\{V_j,V_k,V_l\}$ that define each face.

The vertex positions table 203 comprises vertex position records 208–209 representing the positions of the vertices of the geomorph. Since the positions of the vertices of the geomorph are interpolated between the vertex positions in the fine and coarse meshes according to the blend parameter $\alpha$, the vertex position records 208–209 encode these vertex positions in the fine and coarse meshes, $(x_j^c,y_j^c,z_j^c)$ and $(x_j^f,y_j^f, z_j^f)$.

The discrete attributes table 204 and the scalar attributes table 205 comprise records 210–213 which represent the scalar and discrete attribute values of the faces and corners of the geomorph, respectively. The scalar attribute records 212–213 each encode two scalar attribute values $(S_j^c)$ and $(s_j^f)$ of the corners from both the coarse and fine meshes, for interpolating the value of the scalar attributes according to the blend parameter $\alpha$.

Referring to FIG. 9(b), the illustrated computer system 50 (FIG. 5) performs a method 200 for evaluating and displaying the geomorphs constructed by the method 190. The method 200 typically evaluates the geomorph at a sequence of values of the blend parameter $\alpha$ so as to effect a smooth visual transition between the coarse and fine meshes selected at steps 192, 193 of the method 190 (FIG. 9(a)). The method 200 thus repeats a loop of steps for each value of the blend parameter.

At step 202 of the method 200, the value of the blend parameter $\alpha$ is selected. Again, this value can be selected by the software application or by the computer user. In the case of the software application, $\alpha$ is generally stepped through a sequence of values that smoothly transition the geomorph between the coarser and finer meshes (e.g., 0, 0.25, 0.5, 0.75, and 1.0 in the example geomorph shown in FIGS. 10(a–j)). For selection by the computer user, the software application provides a user interface control which sets the value of $\alpha$. Preferably, a sliding control (e.g., a scroll bar or rotating knob type control) is used to permit the user to smoothly vary the value of $\alpha$. Alternatively, the software application can select values in a pre-defined sequence.

With the value of $\alpha$ selected, the computer system 50 then interpolates the vertex positions $v_j^G(\alpha)$ of the geomorph $M^G$ according to the selected value of $\alpha$ at step 203 as described by the expression (6) above. At step 204, the scalar attributes of the geomorph also are interpolated according to the selected value of $\alpha$ as described above The computer system 50 then regenerates and displays a view based on the geomorph at step 205. As indicated at step 206, the steps 202–205 are then repeated for other selected values of the blend parameter $\alpha$.

Figures 10A, 10B, 10C, 10D, 10E:
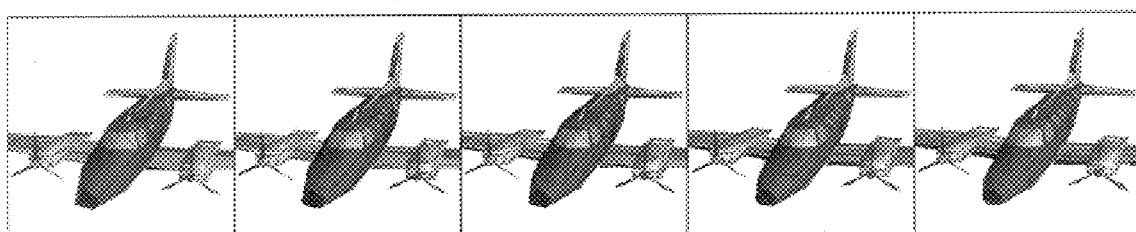
FIGS. 10(a–j) are views of exemplary geomorphs $M^G(\alpha)$ defined between two meshes, $M^G(0)=M^{175}$ (with 500 faces) and $M^G(1)=M^{425}$ (with 1000 faces), specified in a PM representation of the progressive mesh sequence shown in FIG. 24 and evaluated at $\alpha=\{0.0, 0.25, 0.50, 0.75, \text{and } 1.0\}$.
Figures 10F, 10G, 10H, 10I, 10J:
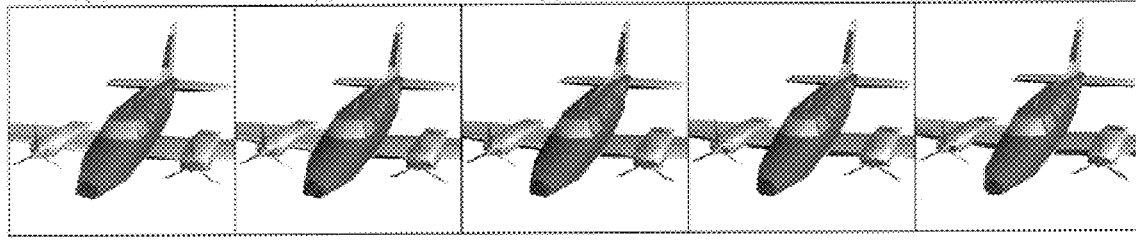
Figures 24A, 24B, 24C, 24D:
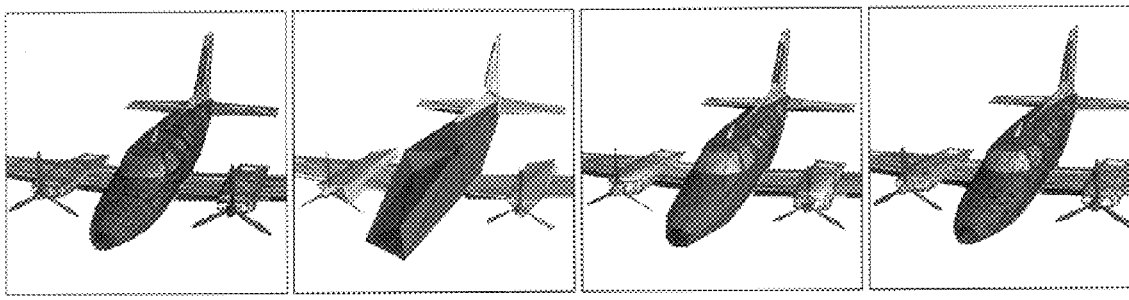
FIGS. 24(a–d) are views of three exemplary meshes ($M^0$ with 150 faces in FIG. 24(b); $M^{425}$ with 1000 faces in FIG. 24(c); and $M^{1925}$ with 4000 faces in FIG. 24(d)) out of a sequence of progressive meshes formed according to the simplification method of FIG. 19 from an example initial arbitrary mesh M with 13,546 faces (FIG. 24(a)).
Figures 25A, 25B, 25C:
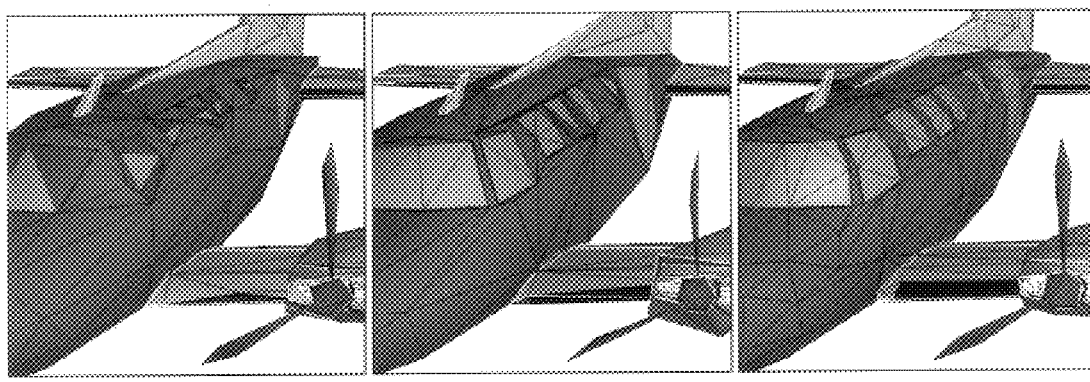
FIG. 25(b) with discontinuity curve topology fixed.
FIG. 25(c) with $E_{disc}$ and with discontinuity curve topology changing) illustrating preservation of the geometry of discontinuity curves.

As an example, FIGS. 10(a–d) demonstrate views of an exemplary geomorph constructed according to the illustrated embodiment between two meshes $M^G(0)=M^{175}$ (with 500 faces) and $M^G(1)=M^{425}$ (with 1000 faces) retrieved from the PM representation of the example original mesh M shown in FIG. 24(a), which includes the example progressive meshes shown in FIGS. 24(b–d).

Referring to FIG. 3, a software system 420 according to the illustrated embodiment of the invention utilizes a number of geomorphs constructed from the PM representation by the methods 190 (FIG. 9(a)) and 220 (FIG. 9(b)) for viewing continuously variable level-of-detail approximations of a mesh. The software system 420 comprises a user interface 422, a graphics application 424, a level of detail approximator 426, and a display driver 428. With the user interface, a user of the computer system 50 (FIG. 5) controls the level of detail of a mesh output by the level of detail approximator 426. The graphics application 424 and display driver 428 then render and display a view of the mesh.

For setting the level of detail of the mesh, the user interface 422 comprises two user interface controls, a D slider control 432 and a T slider control 434. The slider controls 432, 434 preferably are implemented as sliding user interface controls, such as a scroll bar, but alternatively may be implemented as other user interface controls which allow selection of values from a range, such as spin controls and text entry boxes. The D slider control 432 has a single tab, knob or button (shown by the outline arrow in FIG. 3) which can be slid by a user along a bar by manipulating an input device 58 of the computer system 50 (FIG. 5) to thereby vary the value of a detail variable D along a range between 0 and 1. The T slider control 434 has multiple tabs, knobs or buttons which likewise can be slid by a user along a bar by manipulating the input device 58 to thereby vary the values of a set of geomorph complexity variables $T_0, \ldots, T_{g+1}$ along a range between 0 and n, where n is the number of meshes in the PM representation of the mesh. The user interface outputs the detail and geomorph complexity variables D and $T_0, \ldots, T_{g+1}$ to the graphics application 424 to control the level of detail of a mesh produced by the level of detail approximator 426. Preferably, the range of the T slider control 434 is on a logarithm scale so that the complexity of the geomorphs increases exponentially for a linear movement of the control. In some alternative embodiments of the invention, the T slide control 434 can be omitted and the values of the set of geomorph complexity variables $T_0, \ldots, T_{g+1}$ set by the graphics application 424.

The output variables D and $T_0, \ldots, T_{g+1}$ are in turn passed by the graphics application 424 to the level of detail approximator 426. In the level of detail approximator, the geomorph complexity variables $T_0, \ldots, T_{g+1}$ determine the complexities of a set of coarse and fine meshes out of the progressive meshes in a PM representation from which a set of geomorphs $G^0, \ldots, G^g$ is constructed. The detail variable D selects a geomorph out of the set of geomorphs and the value of the blend parameter at which to evaluate the geomorph to produce an approximation of the mesh at a desired level of detail.

The level of detail approximator 426 comprises an interpolator 436, a PM representation block 438, and a geomorphs table 440. The interpolator 436 converts the value of the detail variable D to an index j for a geomorph G(out of the set of geomorphs $G^0, \ldots, G^g$ and to a value of the blend parameter $\alpha$. For example, where there are 10 geomorphs in the set $G^0, \ldots, G^g$, the interpolator 436 can allocate the range of the detail variable D between 0.0 and 0.1 to the first geomorph $G^0$, and calculate the blend parameter for that geomorph as $\alpha=10D$. Similarly, the range between 0.1 and 0.2 is allocated to the second geomorph $G^1$, and the blend parameter for that geomorph calculated as $\alpha=10(D-0.1)$, etc. The interpolator 436 can be implemented as a block of code which calculates a linear interpolation of the detail variable D to a selected geomorph $G^j$ and blend parameter $\alpha$. Alternatively, the interpolator 436 is implemented as a look up table which maps the detail variable D to the selected geomorph $G^i$ and blend parameter $\alpha$.

The PM representation block 438 is a PM representation data structure, such as the data structure 130 shown in FIG. 7, of the mesh being approximated. The geomorphs table 440 is an ordered list of geomorph blocks 441–443 for the geomorphs $G^0, \ldots, G^g$. Each of the geomorph blocks 441–443 is a geomorph data structure such as the geomorph data structure 200 shown in FIG. 26 The level of detail approximator constructs the geomorphs $G^0, \ldots, G^g$ stored as blocks 441–443 from the PM representation stored as block 438 according to the geomorph construction method 190 of FIG. 9(a) For each of the geomorphs $G_j$, the values of the geomorph complexity variables $T_j$ and $T^{j+1}$ specify the coarse and fine meshes $M^{Tj}$ and $M^{Tj+1}$ out of the progressive meshes specified in the PM representation from which the geomorph is constructed. For example, the geomorph complexity variables $T^0$ and $T^1$ specify the coarse and fine mesh $M^{T0}$ and $M^{T1}$ for the geomorph $G^0$ out of the progressive meshes $M^0, \ldots, M^n$ specified in the PM representation. In the illustrated system 420, the geomorph complexity variables $T_0, \ldots, T_{g+1}$ specify the number $0, \ldots, n$ of the mesh in the progressive meshes sequence $M^0, \ldots, M^n$. Alternatively, the geomorph complexity variables $T_0, \ldots, T_{g+1}$ can specify the number of faces or number of vertices of the fine and coarse meshes of the set of geomorphs (in which case the T slider control 434 has a range from a minimum to a maximum number of the faces or vertices in the PM representation).

After constructing the set of geomorphs respresented in the geomorphs table 440 based on the geomorph complexity variables $T_0, \ldots, T_{g+1}$, the level of detail approximator 426 evaluates the geomorph according to the geomorph evaluation method 220 (FIG. 9(b)) based on the interpolated values for desired geomorph $G^j$ and blend parameter $\alpha$. This produces approximation of the mesh at a desired level of detail which the level of detail approximator 426 outputs to the graphics application 424. The graphics application 424 then renders an image of the approximating mesh using conventional mesh rendering techniques, and outputs the image to the display driver 428 for display on an output device 60 of the computer system 50 (FIG. 5).

Progressive transmission.

Figure 11:
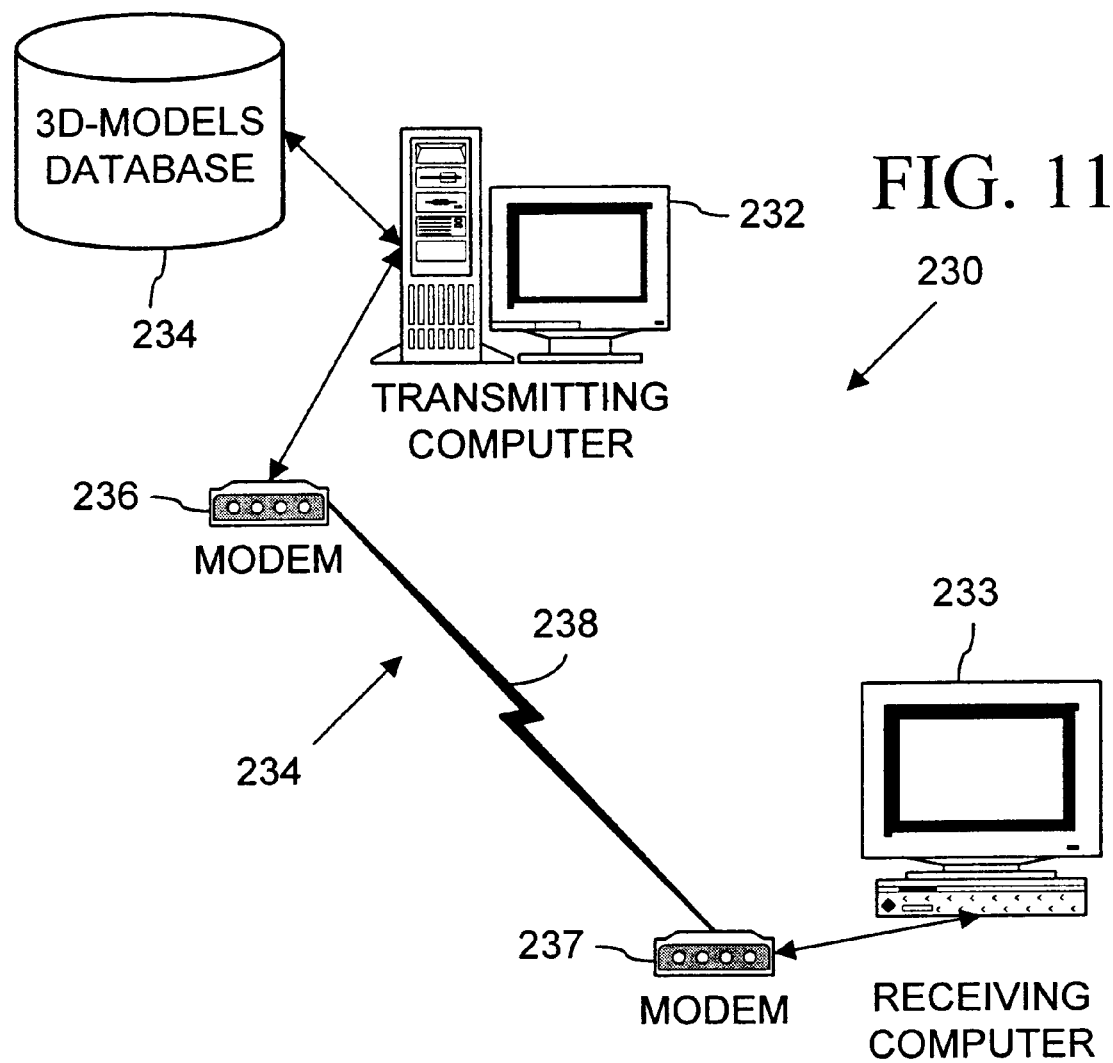
FIG. 11 is a block diagram of a system according to the illustrated embodiment of the invention for progressively transmitting and displaying views of a three dimensional object based on the PM representation.

With reference to FIG. 11, a system 230 according to the illustrated embodiment of the invention utilizes the PM representation for progressive transmission of three dimensional graphics models at multiple levels-of-detail The system 230 comprises a transmitting computer 232 (such as a network or file server) and a receiving computer 233 (such as a client computer station or terminal) which are linked via a communications link 234. These computers 232–233 have the architecture of the computer system 50 shown in FIG. 5. The communications link 234 in the illustrated progressive transmission system 230 comprises modems 236–237 and a telephone line 238, but alternatively can be realized as a local or wide area computer network (including public and private switched networks, commercial online services, the internet and the like), a broadcast data network, an infra-red or radio frequency link or other communications technologies. The transmitting computer 232 stores a PM representation of an arbitrary mesh $\underline{M}$ in a database 240 of three dimensional models, and runs a progressive transmission software application that implements a transmitting process 244 (FIG. 12(a)) for transmitting a PM representation in the database 240 to the receiving computer 233 on the communications link 234. The receiving computer 233 runs a progressive transmission software application that implements a receiving process 246 (FIG. 12(b)) for receiving the PM representation from the communications link 234 and rendering views of the mesh at progressively finer levels of detail.

Figure 12A:
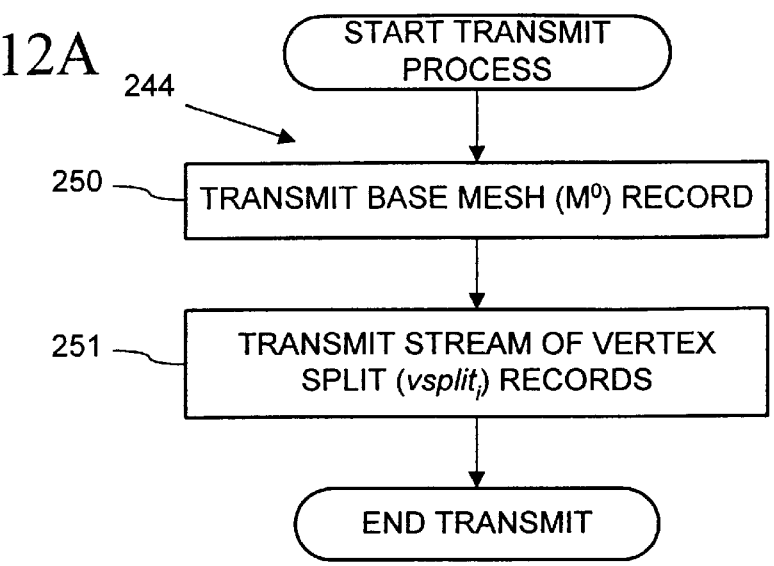
FIGS. 12(a–b) are flow charts of a transmitting method and a receiving method in the system of FIG. 11 for progressively transmitting and interactively displaying views based on the PM representation

Referring now to FIG. 12(a), according to the progressive transmission method 244, the transmitting computer 232 (FIG. 11) first transmits the base mesh $M^0$ of the PM representation (e.g., as the base mesh record 132 of FIG. 7 or as a conventional uni-resolution format), followed by the stream 134 (FIG. 7) of the vertex split $vsplit_i$ records 136 (FIG. 7).

Figure 12B:
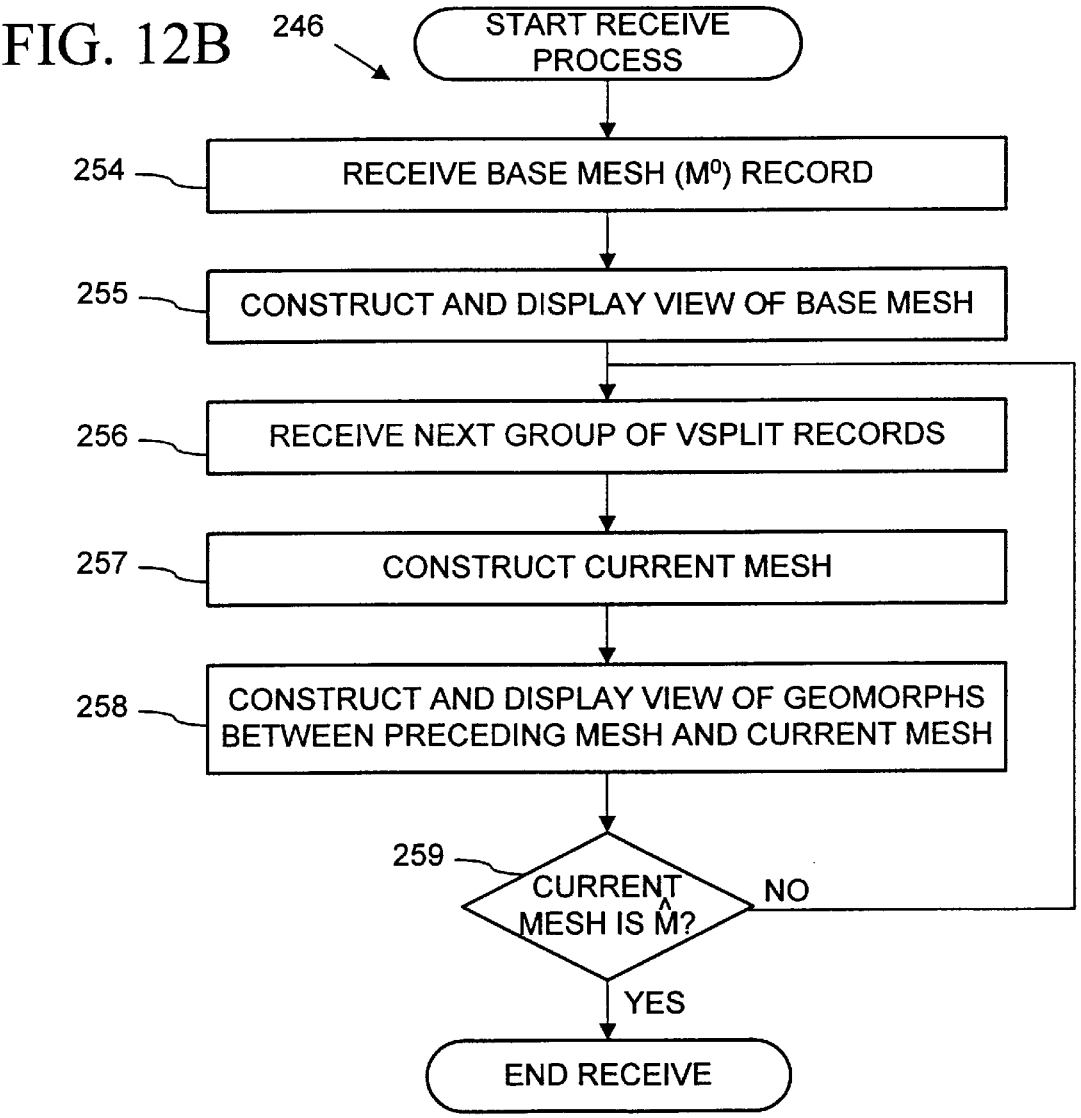
Figure 13:
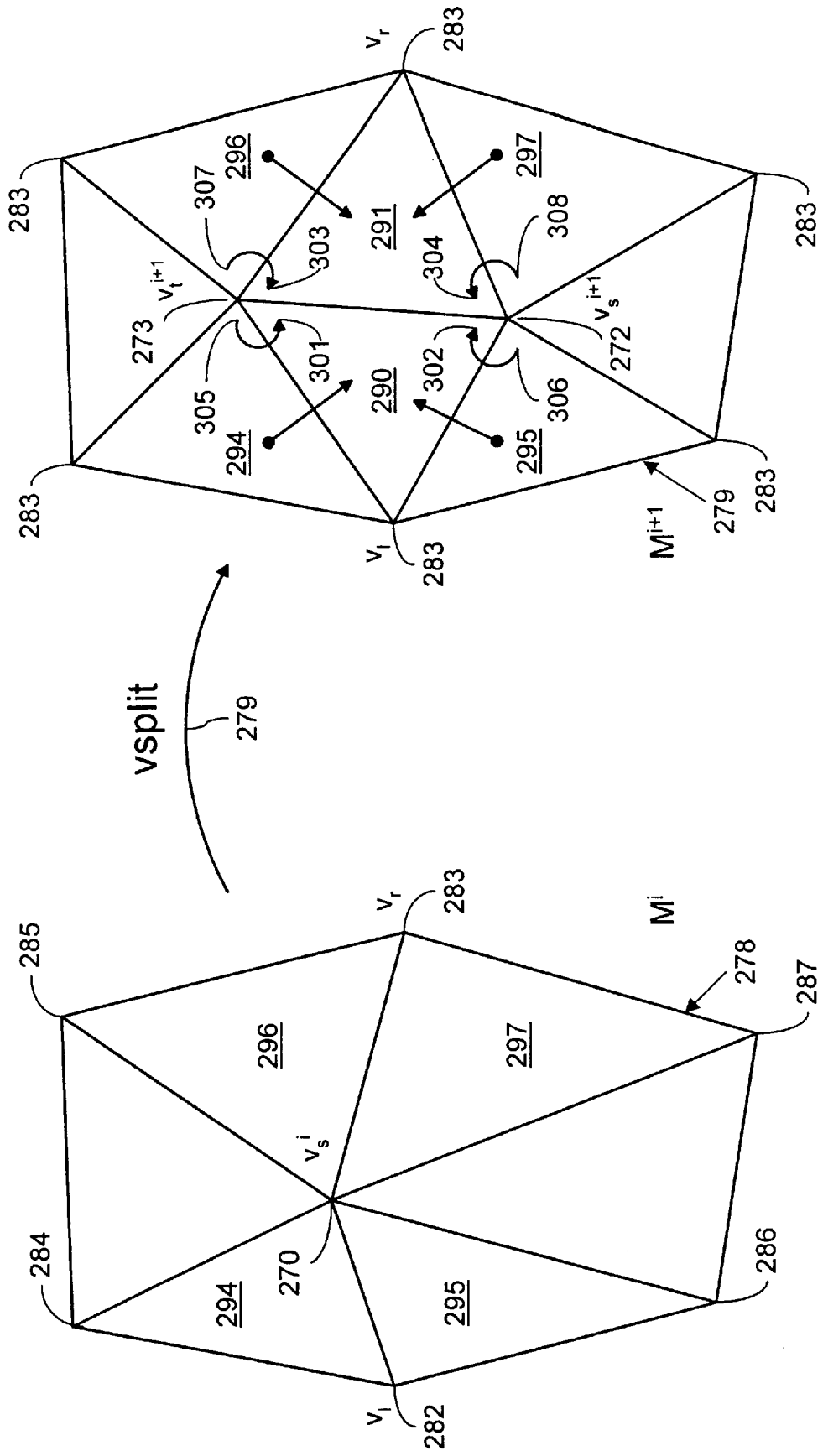
FIG. 13 is a block diagram of a vertex split transformation specified in a PM representation and illustrating encoding of attributes in a vertex split record with predictive and delta encoding for mesh compression.

Referring to FIG. 12(b), the receiving process 246 incrementally rebuilds the arbitrary mesh $\underline{M}$ specified by the PM representation as the vertex split records arrive, and animates the view of the changing mesh. In the illustrate receiving process 246, the changes to the mesh are geomorphed to avoid visual discontinuities. The original mesh $\underline{M}$ is recovered exactly after all n vertex split records in the PM representation are received, since PM is a lossless representation.

At step 254 of the illustrated receiving process 246, the receiving computer 233 (FIG. 11) first receives the base mesh $M^0$ record 132 (FIG. 7) transmitted from the transmitting computer 232 (FIG. 11) at step 250 of process 244. The receiving computer 233 then constructs and displays a view of the base mesh at step 255.

Next, in a loop of steps 256–259, the receiving computer 232 incrementally reconstructs the mesh $\underline{M}$ and interactively displays a view of the mesh. At step 256 in each iteration of the loop, the receiving computer 233 receives a next group of vsplit records 136 (FIG. 7) transmitted from the transmitting computer 232 at step 251 of process 244. Since the transmitting computer 232 transmits the vsplit records continuously, the receiving computer 233 of the illustrated embodiment includes an input buffer which temporarily stores vertex split records transmitted during the constructing and displaying steps 255, 257–258 until the receiving computer is ready to process them.

At step 257, the receiving computer 233 incrementally refines the mesh to a current incremental mesh by applying the group of vsplit records received at step 256 to a previous incremental mesh. In the first iteration of the loop, the previous incremental mesh is the base mesh from step 255. In subsequent iterations of the loop, the previous incremental mesh is the current incremental mesh from the previous iteration of the loop. At step 258, the receiving computer 233 then constructs a geomorph from the previous incremental mesh to the current incremental mesh, and displays a visually smooth transition between the incremental meshes using the geomorph. The step 258 can optionally be omitted, and the mesh constructed at step 257 instead displayed.

The receiving process preferably balances computation between the progressive reconstruction of the mesh $\underline{M}$ and interactive display by varying the number of vertex split records received at the step 256 in each iteration of the loop 256–259. In the presence of a slow communication line, a simple strategy is to display the current mesh whenever the input buffer is found to be empty (i.e., vsplit records are continuously applied at step 257 until the input buffer is exhausted, then the geomorph is constructed and displayed as the input buffer is replenished before repeating in a next iteration of the loop). For a fast communication line (i.e., where transmission of the vsplit record stream 134 (FIG. 7) takes less time then constructing and displaying geomorphs from the base mesh to more than one incremental mesh out of the progressive mesh sequence), an alternative strategy is to display meshes whose complexities increase exponentially (i.e., a number p of vsplit records received at step 256 in each iteration of the loop increases exponentially) For fast communication lines, the step 258 of constructing and displaying a geomorph from the preceding mesh is substituted with displaying the mesh from step 257.

Mesh compression.

The PM representation of the illustrated embodiment also provides a space-efficient representation for storing meshes. The PM representation encodes not only the initial mesh M, but also a continuous resolution family of meshes, in a space competitive with that of a compressed uni-resolution mesh.

Firsts the size of the PM representation is linear on the size of the initial mesh $M^n$ since the number n of vsplit records is less than the number $m_0+n$ of vertices in $M^n$. More importantly, because a vertex split is a local transformation on the surface, one can expect significant coherence in surface attributes before and after each transformation. The PM representation of the illustrated embodiment takes advantage of this coherence by encoding the vertex split records with predictive and delta encoding schemes.

In particular, with reference to FIG. 12, the vertex positions $v_{si}^{i+1}$ (i.e., the position of vertex 272) and $v_{m0+i+1}$ (i.e., the position of vertex 273) can be predicted from $v_{si}^i$ (i.e., the position of vertex 270) in each vertex split vsplit, transformation 276 between mesh $M^i$ 278 and mesh $M^{i+1}$ 279. That is, the positions of vertices 272–273 is expected to be near the position of vertex 270. Thus, the illustrated computer system 50 (FIG. 5) encodes the vertex positions in each vspliti record 136 (FIG. 7) as the difference or delta from the vertex position $v_{si}^i$ (i.e., $A_i=(v_{si}^{i+1}-v_{si}^i, v_{m0+i+1}^{i+1}-v_{si}^i)$), which requires fewer bits to encode for a given precision than the full coordinates (x,y,z) of vertex positions $v_{si}^{i+1}$ and $v_{m0+i+1}^{i+1}$. Preferably, these position differences or deltas are encoded in the vertex split records with a variable length delta encoding scheme, e.g., variable length Huffman codes. Suitable variable length codes including Huffman codes are described in M. Deering, *Geometry Compression*, 1995 Computer Graphics Proceedings 13–20 [hereafter "Deering"].

In the illustrated embodiment, the number of bits needed to delta encode the vertex positions is further reduced by exploiting a property of the mesh simplification method (FIG. 19) that for the collapse of each edge $\{v_{si}^{i+1}, v_{m0+i+1}\}$ 92 (FIG. 6), the method considers three starting points for the vertex $v_{si}^i$ 86' in the resulting mesh: namely, $\{v_{si}^{i+1}, v_{m0+i+1}, (v_{si}^{i+1}+v_{m0+i+1})/2\}$. Depending on the starting point chosen by the method, the positions $\{v_{si}^{i+1}, v_{m0+i+1}\}$ are delta-encoded as either position deltas $\{v_{si}^{i+1}-v_{si}^i, v_{m0+i+1}-v_{si}^i\}$ for starting positions $v_{si}^{i+1}$ or $v_{m0+i+1}$, or as position deltas $\{((v_{si}^{i+1}+v_{m0+i+1})/2)-v_{si}^i, (v_{si}^{i+1}-v_{m0+i+1})/2\}$ for starting position $(v_{si}^{i+1}+v_{m0+i+1})/2$. The vertex split records therefore encode the choice of the starting position, then the appropriate pair of position deltas. Since each of the four position delta tend to have different value ranges, the four position deltas preferably are encoded with separate Huffman code tables adjusted to those value ranges.

In a further alternative PM representation, the construction algorithm can simply select $v_{si}^i \in \{v_{si}^{i+1}, v_{m0+i+1}, (v_{si}^{i+1}+v_{m0+i+1})/2\}$. This degrades the accuracy of the simplified base mesh, but allows the positions $\{v_{si}^{i+1}, v_{m0+i+1}\}$ to be encoded with even fewer bits in the vertex split records (e.g., the choice of the position $v_{si}^i$ out of the set of positions $\{v_{si}^{i+1}, v_{m0+i+1}, (v_{si}^{i+1}+v_{m0+i+1})/2\}$ and then either the position delta $v_{m0+i+1}-v_{si}^i$ for $v_{si}^i=v_{si}^{i+1}$, or the position delta $v_{si}^{i+1}-v_{si}^i$ for $v_{si}^i=v_{m0+i+1}$, or the position delta $(v_{si}^{i+1}-v_{si}^i$ for $v_{si}^i=(v_{si}^{i+1}+v_{m0+i+1})/2)$ Further, since only a small set of vertices 282–287 is adjacent to the vertex $v_{si}$ 270 in the mesh $M^i$ 278, a small number of bits can be used to specify the vertices $v_{li}$ 282 and $v_{ri}$ 283 out of the vertices 282–287 adjacent to vertex $v_{si}$ 270. Rather than encode indices (hereafter "full vertex indices") of vertices $v_{li}$ 282 and $v_{ri}$ 283 in the vsplit$_i$ record 136 (FIG. 7) to uniquely distinguish them out of the set of all $m_0+n$ vertices in the original mesh $M^n$ (which requires more bits), the illustrated computer system 50 encodes indices (hereafter "adjacent vertex indices") in the vsplit$_i$ record 136 indicating which out of the set of adjacent vertices 282–287 are the vertices $v_{li}$ 282 and $v_{ri}$ 283 (such as assigning adjacent vertex indices to the adjacent vertices in ascending order of their full vertex indices). For the illustrated vertex split transformation 276, the vertices $v_{li}$ 282 and $v_{ri}$ 283 can then be encoded in 3 bits each (which is sufficient to uniquely specify the vertices out of the six possible adjacent vertices). By contrast, even a simple mesh $M^n$ with 1,000 vertices requires at least 10 bit full vertex indices to uniquely specify each vertex of the mesh.

Additionally, the discrete attributes (e.g., material identifiers) $d_{\{vs,vt,vl\}}$ and $d_{\{vs,vt,vr\}}$ of the faces 290–291 introduced by the vsplit$_i$ transformation 276 in mesh $M^{i+1}$ 279 can often be predicted from that of adjacent faces 294–297 in $M^i$ 278 using only a few control bits. In the illustrated embodiment, for example, the control bits 00, 01, and 11 indicate that the discrete attributes of a newly introduced face is either equal to that of the adjoining face (e.g., faces 294, 296) having $v_t^{i+1}$ as a vertex, equal to that of the adjoining face (e.g., faces 295, 297) having $v_s^{i+1}$ as a vertex, or different from both adjoining faces. When the discrete attribute of a newly introduced face is equal to that of an adjoining face, the control bits 00 or 01 suffice to specify that discrete attribute. Where the discrete attribute is different from that of both adjoining faces, the control bits 11 are followed by a value fully specifying the discrete attribute. Thus, in most cases, the vsplit$_i$ record 136 can encode the discrete attributes such as the material identifier of the newly introduced faces in only two bits each.

Scalar attributes of newly introduced corners 301–304 in $M^{i+1}$ 279 can similarly be predicted from neighboring corners 305–308 in $M^i$ 279. Thus, in the illustrated embodiment, these scalar attributes also can be encoded using one or more control bits to indicate equality with a neighboring corner or a different scalar attribute. For example, in the illustrate embodiment, a scalar attribute associated with the newly introduced corner 301 is encoded in the vsplit$_i$ record 136 (FIG. 7) with a control bit 0 to indicate the scalar attribute is equal to that of the neighboring corner 306. Whereas, encoding with a control bit 1 followed by the value of the scalar attribute indicates a different scalar attribute. Preferably, in this latter case, the value is encoded by a variable length delta encoding as the difference from the scalar attribute of the neighboring corner 306 (which in at least some cases save some additional bits).

As a result of the above encoding scheme of the illustrated embodiment, the size of a carefully designed PM representation should be at least competitive with that obtained from other prior methods for compressing uni-resolution meshes.

Selective Refinement

With reference to FIGS. 13–17, the PM representation 130 (FIG. 7) of the illustrated embodiment also supports selective refinement, whereby detail is added to the model only in desired areas. In general, the illustrated embodiment of the invention performs selective refinement by selectively applying only a subset of the vertex split transformations specified in the PM representation that refine the mesh in desired areas, such as the surface of the mesh within a view frustum (i.e., the portion of the mesh that is within a view of the mesh currently being displayed).

Figure 14:
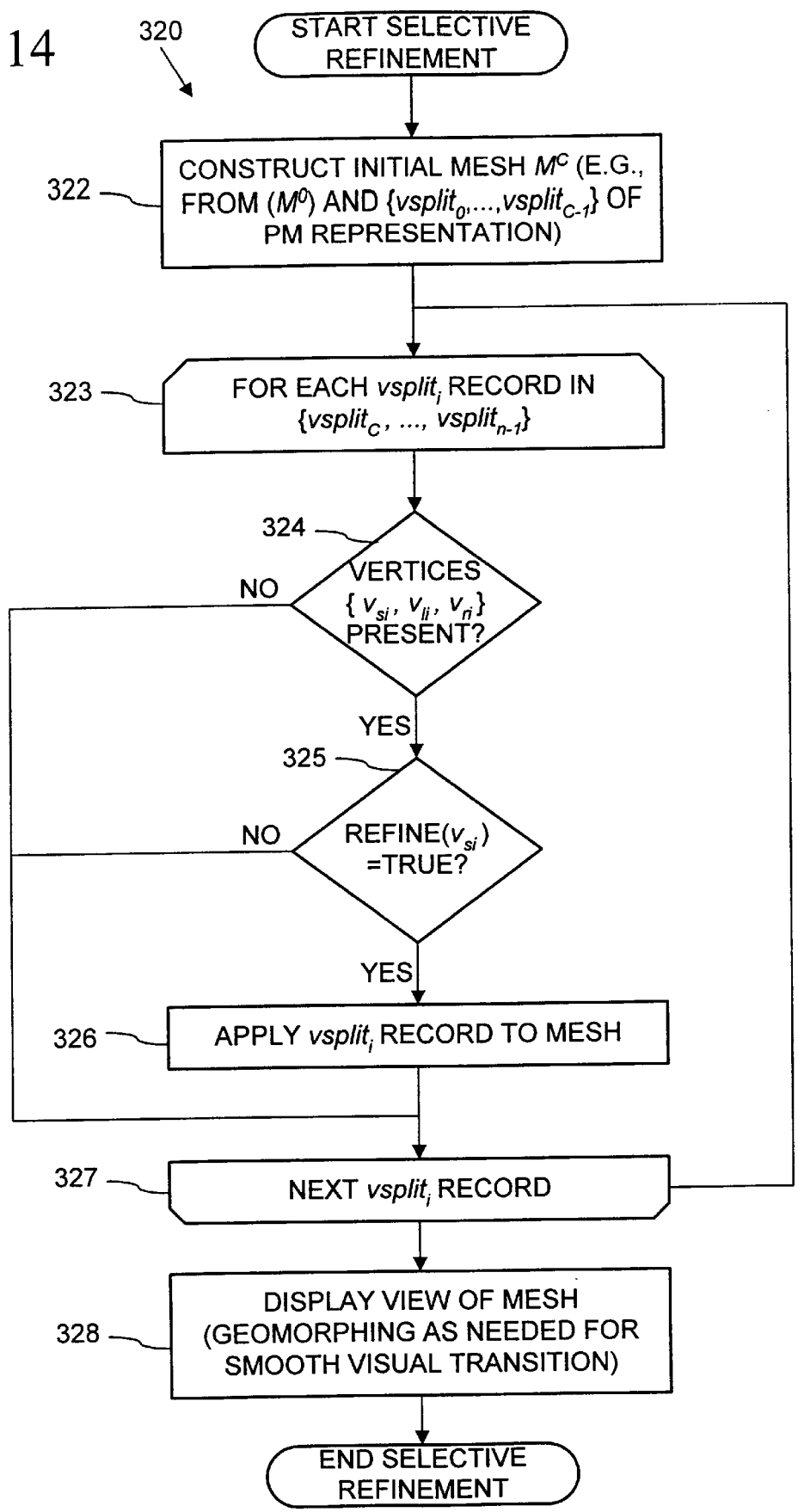
FIG. 14 is a flow chart of a method according to the illustrated embodiment of the invention for selective refinement of a mesh based on the PM representation of FIG. 7.

Referring now to FIG. 14, a first selective refinement method 320 utilizes a callback function, REFINE(v), to determine which vertex split transformations in the PM representation to apply in selectively refining an initial coarse mesh $M^c$. The REFINE(v) function returns a Boolean value indicating whether the neighborhood of the mesh about v should be further refined. As an example, to obtain selective refinement of the mesh within a view frustum (i.e., the portion of the mesh within a currently displayed view of the mesh), the REFINE(v) function is defined to be true if either v (edg., vertex $v_s^i$ 270 of FIG. 12) or any of its neighboring vertices (e.g, vertices 282–287 of FIG. 12) lies within the frustum. In the illustrated embodiment, the REFINE(v) function is supplied by a software application which interactively displays views of the mesh.

The first selective refinement method 320 begins at step 322 by constructing an initial mesh $M^c$, with $0 \leq C < n-1$, out of the sequence of progressive meshes, $M^0, \ldots, M^n$, specified by the PM representation 130 (FIG. 7). The initial mesh $M^c$ is constructed by applying the vertex split records $vsplit_i$ 136 (FIG. 7) for all $i<C$ if any, to the base mesh $M^0$.

The first selective refinement method 320 then comprises a loop of steps 323–237. In the loop, the process 320 selectively refines the initial mesh $M^c$ by iterating through the remaining vertex split records $\{vsplit_c, \ldots, vsplit_{n-1}\}$ 136 as before, but only performing the $vsplit_i$ $(s_i, l_i, r_i, A_i)$ transformation at step 326 if: (1) all three vertices $\{v_{si}, v_{li}, v_{ri}\}$ are present in the mesh (step 324), and (2) REFINE($v_{si}$) evaluates to TRUE (step 325). (A vertex $v_j$ is absent from the mesh at step 324 if the prior vertex split that would have introduced it, $vsplit_{j-m0-1}$, was not performed due to the above conditions of steps 324–325.)

After the loop 323–327 is repeated for all the vertex split records $vsplit_i$ 136, $C \leq i < n$, the mesh has been selectively refined such that additional detail is added to the initial mesh $M^c$ in areas where more detail is desired (e.g., within the view frustum) while other areas remain coarse. At step 328, the process can then display a view of the selectively refined mesh. As needed to avoid the popping effect, the process 320 can construct and display geomorphs (e.g., using process 190 of FIG. 9) between the initial mesh $M^c$ and the selectively refined mesh.

Figures 16A, 16B:
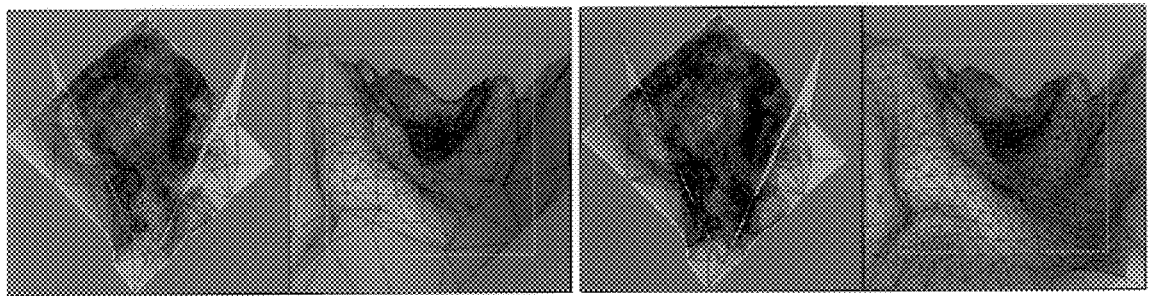
FIGS. 16(a–b) are views of exemplary meshes produced by selective refinement within a view frustum according to the methods of FIG. 14 (with 9,462 faces shown in FIGS. 16(a)) and 15 (with 12,169 faces shown in FIG. 16(b)), respectively.

With reference to FIG. 16(a), a first example mesh modeling a three dimensional terrain and selectively refined by the method 320 (FIG. 14) has additional detail within a view frustum currently being displayed by the software application running on the computer system 50 (FIG. 5). For ease of illustration, only the first 10,000 (out of 33,844) vertex split transformations in the PM representation of the terrain model were considered for selective refinement (to keep the mesh from becoming too dense to be perceptible).

Figure 15:
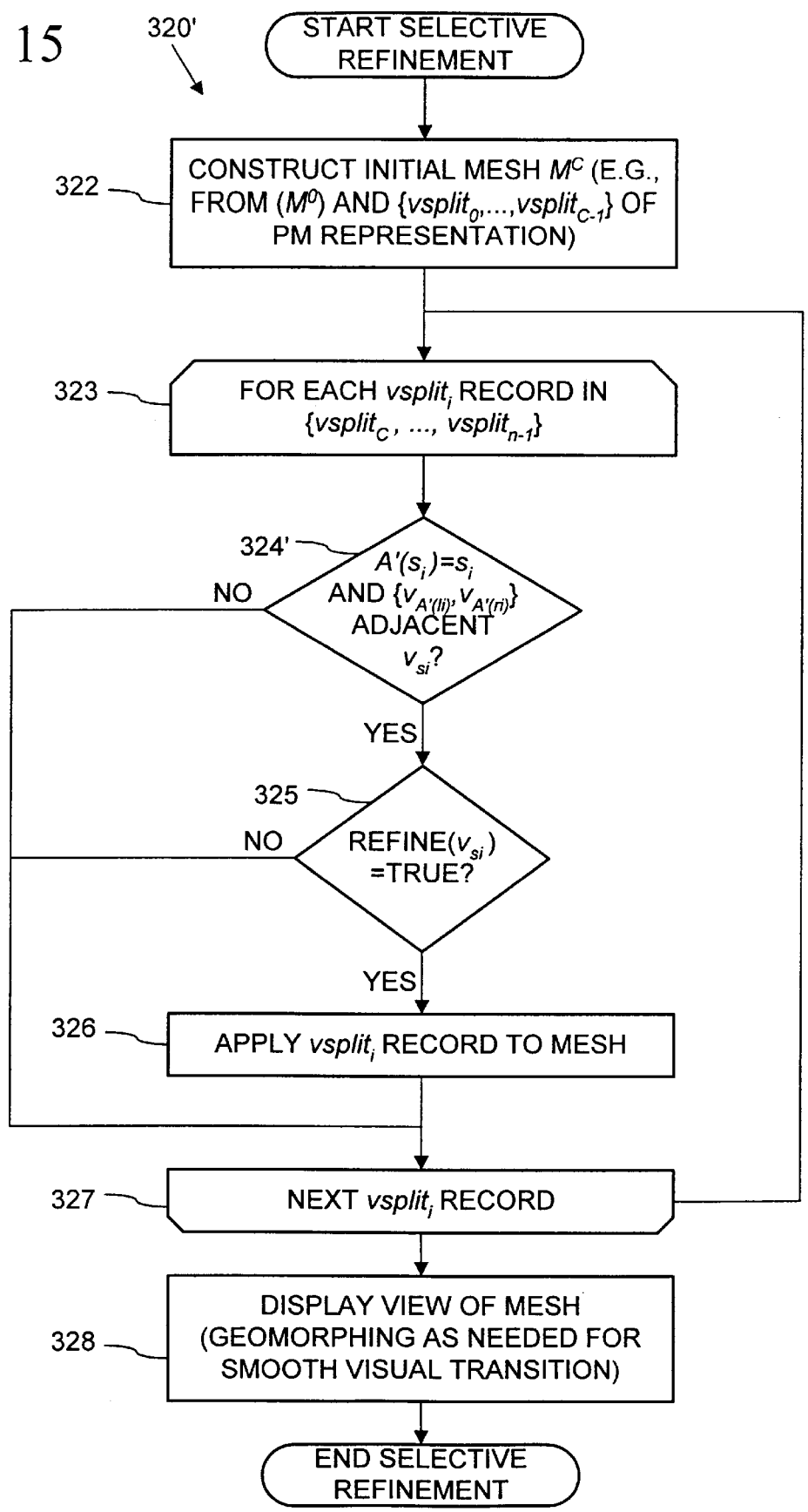
FIG. 15 is a flow chart of an alternative method according to the illustrated embodiment of the invention for selective refinement of a mesh based on the PM representation of FIG. 7 and using a closest living ancestor condition.

Referring to FIG. 15, a modified selective refinement method 320' permits more vertex split transformations to be applied near the boundaries of the localized area. A drawback of the method 320 (FIG. 14) is that a vertex $v_{si}$ within the view frustum 332 (FIGS. 16(a–b)) may fail to be split because its expected neighbor $v_{li}$ or $v_{ri}$ lies just outside the frustum and was not previously created This is remedied in the modified method 320' by using a less stringent version of the condition in step 324 (FIG. 14). In a modified condition of step 324', the closest living ancestor of a vertex $v_j$ is defined to be the vertex with index $$A'(j) = \begin{cases} j, & \text{if } v_j \text{ exists in the mesh} \\ A'(s_{j-m0-1}), & \text{otherwise} \end{cases} \quad (11)$$

The modified condition of step 324' is that: $A'(s_i)=s_i$ (i.e., $v_{si}$ is present in the mesh), and the vertices $v_{A'(li)}$ and $v_{A'(ri)}$ are both adjacent to $v_{si}$ in the mesh. As when constructing the geomorphs, the ancestor information A' is carried efficiently as the vsplit records are parsed in the illustrated embodiment. If the conditions of both steps 324' and 325 are satisfied, $vsplit$ $(s_i, A'(l_i), A'(r_i), A_i)$ is applied to the mesh at step 326 as in the method 320 (FIG. 14). The remaining steps 322, 323, 327 and 328 in the modified selective refinement method 320' are the same as in the first selective refinement method 320.

FIG. 16(b) demonstrates a second example selectively refined mesh which has been selectively refined by the modified method 320' (FIG. 15) from the same PM representation of a terrain model as the first example selectively refined mesh 330 of FIG. 16(a). Again, for convenience of illustration, only the first 10,000 vertex split transformations (out of 33,844 vertex split transformations) of the PM representation were considered by the selective refinement method. Since the more lenient closest ancestor condition of step 324' allows more of the vertex split records $\{vsplit_c, \ldots, vsplit_{n-1}\}$ 136 to be applied, the second example selectively refined mesh has much more detail within the view frustum than the first example selectively refined mesh (i.e., 12,169 faces in the second example mesh shown in FIG. 16(b) versus 9,462 faces in the first example mesh shown in FIG. 16(a)).

Figure 17:
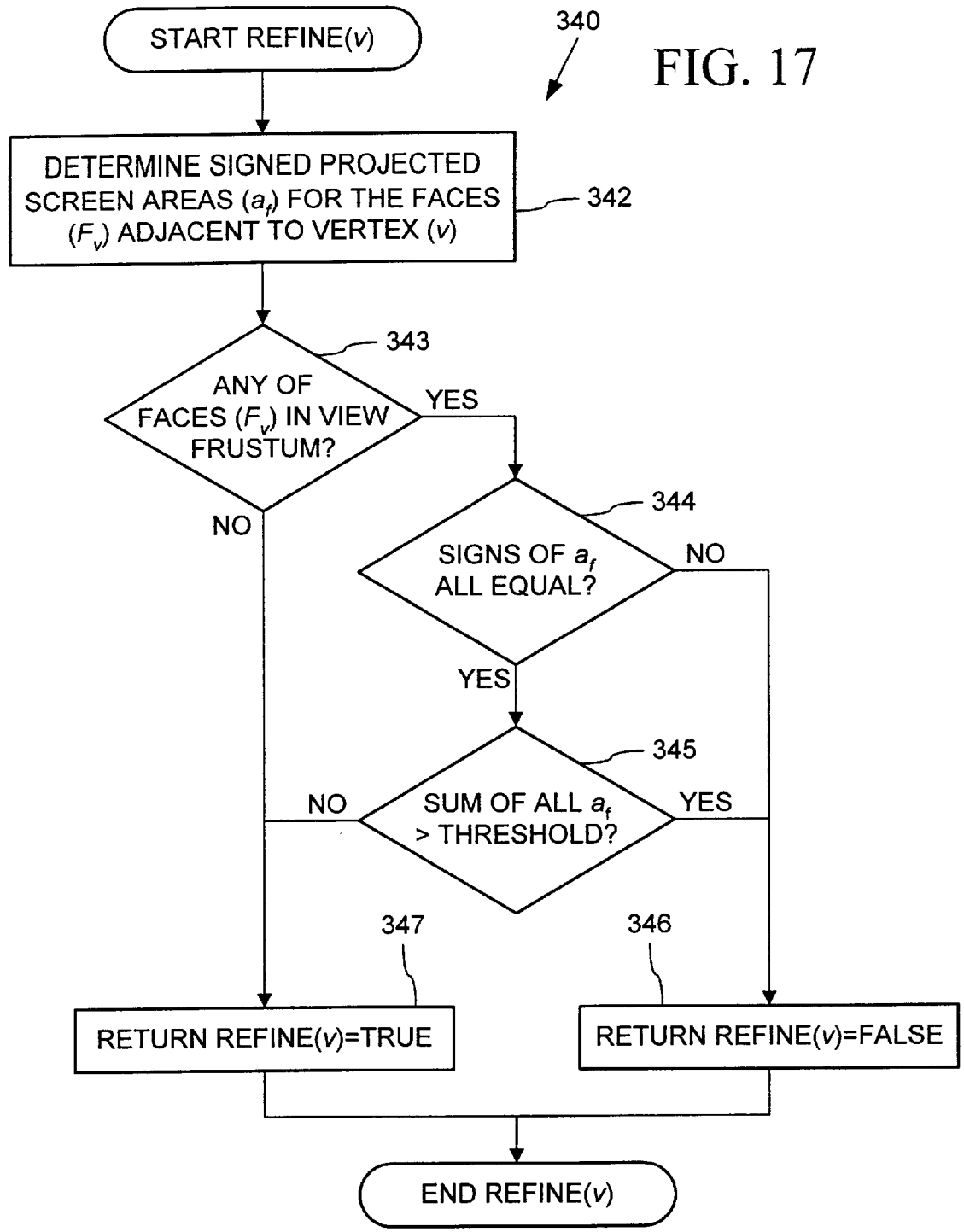
FIG. 17 is a flow chart of a further modification of the methods of FIGS. 13 and 14 for selective refinement of a mesh based on the PM representation of FIG. 7 which maintains more detail near silhouette edges and near the viewer.

Referring to FIG. 17, a further drawback to the selective refinement methods 320 and 320' described above is that the above-described REFINE(v) function can still add a lot of detail to the selectively refined meshes shown in FIGS. 16(a–b) that have little or no effect on the currently displayed view of the mesh. For example, the above-described REFINE(v) function yields a true result for vertex split transformation on a vertex $v_s$ within the view frustum, but far from the viewer. Such details add little to the displayed view, but add significantly to the rendering time of the view. Substituting a modified REFINE(v) method 340 improves the above described selective refinement methods 320 and 320' by concentrating refinement near silhouette edges and near the viewer.

In a first step 342 of the modified REFINE(v) method 340, the method 340 calculates a signed projected screen area $\{a_f: f \in F_v\}$ of each of the faces $F_v$ adjacent to the vertex v (i.e., the area taken by the face in the currently displayed view) The modified REFINE(v) method 340 then evaluates to or returns the Boolean value true at step 346 (i.e., to step 325 of the selective refinement methods 320 or 320'), if: (1) any face $f \in F_v$ lies within the view frustum (step 343) and either (2a) the signs of the projected display areas $a_f$ of the faces are not all equal (indicating that v lies near a silhouette edge) (step 344) or (2b) the sum of the projected screen areas ($\Sigma_{f \in F_v} a_f$) is greater than a predetermined screen area threshold (e.g., $0.16^2$ units where the image has unit area). Otherwise the modified REFINE(v) method 340 returns false at step 347 (to step 325 of the selective refinement methods 320 or 320').

Figure 18A:
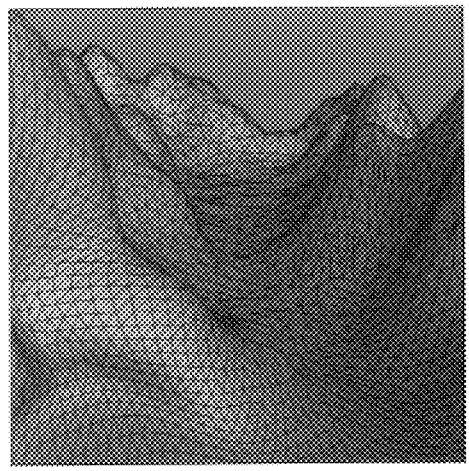
FIGS. 18(a–b) are views of an exemplary mesh (with 7,438 faces) produced by selective refinement within a view frustum according to the method of FIG. 17.
Figure 18B:
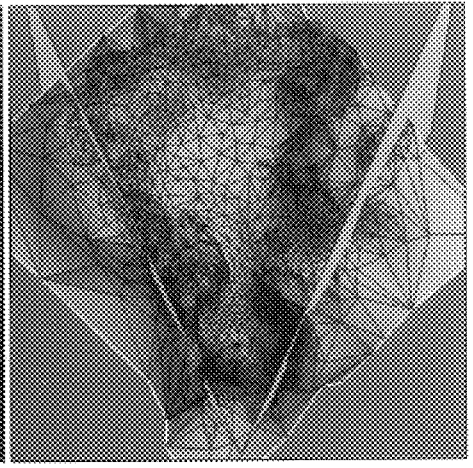

Referring to FIGS. 18(a–b), a third example selectively refined mesh (shown in FIGS. 18(a–b)) is produced by the selective refinement method 320' with the modified REFINE (v) method 340 from the same PM representation of a terrain model as the first and second example meshes shown in FIGS. 16(a–b). All 33,844 vertex split transformations were considered by this modified selective refinement method in this third example. Despite considering many more vertex split transformations, the third example mesh (FIGS. 18(a–b)) has far fewer faces (i.e., 7,438 faces) than both the first and second example meshes (i.e., 9,462 and 12,169 faces) (FIGS. 16(a–b)), while providing refinement of visually significant details (ice., those within the view frustum, near silhouette regions, and near the viewer) substantially equal to that of the second example mesh (FIG. 16(b))' As can be seen by the overhead view of the third example selectively refined mesh shown in FIG. 18(b), with the REFINE(v) method 340 (which takes into account the view frustum, silhouette regions and screen size of faces), the selective refinement process 320' saves complexity of the resulting selectively refined mesh by avoiding refinement in areas within the view frustum that do not contribute significantly to the view being displayed.

A further alternative selective refinement method is one that takes into account the visibility of the PM representation's vertex split transformations. Although the vertex of a vertex split transformation lies within the view frustum, it may still not be currently visible to the viewer if occluded or positioned behind another portion of the surface or a different object entirely For example, vertices on the far side of a ridge on the terrain model are not visible to the viewer, even if they are within the view frustum. For this alternative selective refinement method, the REFINE(v) function is further modified to return a negative or false result if the vertex is not visible This results in an even simpler selectively refined mesh with a substantially equal quality of appearance in its currently visible areas.

The above described selective refinement methods 320, 320' and 340 also can be beneficially applied to efficiently transmitting view-dependent models over low-bandwidth communication lines. As the receiver's view changes over time, the transmitting process (e.g., such as the transmitting process 244 of FIG. 12(a)) utilizes the above described selective refinement conditions (e.g., steps 324 or 324' along with step 325 or step 325 as modified by method 340) to select and transmit only vertex split transformation records $vsplit_i$ 136 within a currently viewed area of the mesh. As the view changes, the transmitting process further transmits any not yet sent vertex split records 136 for the changed view. Specifically, at each time frame, the transmitting process need only transmit those vertex split transformation records for which the REFINE(v) method evaluates to true and which were not transmitted in earlier time frames.

Constructing the PM representation

Figure 19:
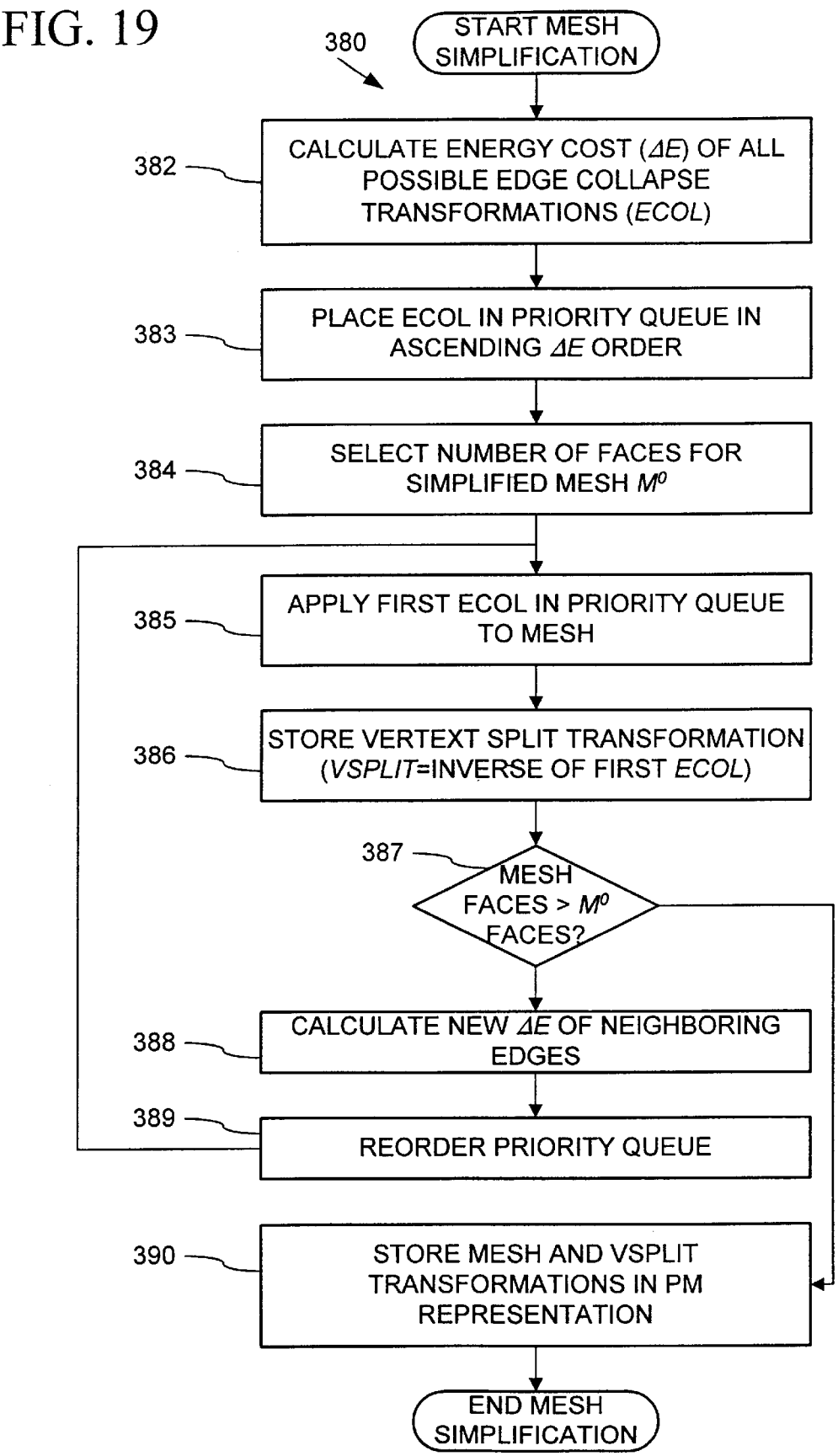
FIG. 19 is a flow chart of a mesh simplification method according to the illustrated embodiment of the invention for constructing the PM representation of an arbitrary mesh.

With reference to FIG. 19, a mesh simplification and PM construction method 380 constructs the PM representation 130 (FIG. 7) of an arbitrary mesh $\underline{M}$ by first selecting a sequence of edge collapses that transform $\underline{M}=M^n$ into a simplified base mesh $M^0$. A sequence of vertex split transformations that is the inverse of the selected edge collapses is then encoded with the base mesh $M^0$ as a PM representation of the arbitrary mesh $\underline{M}$. The quality of the intermediate approximations or progressive meshes $M^i$, i<n specified by the resulting PM representation depends largely on appropriately selecting which edges to collapse and what attributes to assign to the affected neighborhoods (e.g., the vertex positions $V_{si}^{\ i}$).

For use in appropriately selecting the edge collapse transformations in the illustrated PM construction method 380, an explicit energy metric E(M) is defined to measure the accuracy of simplified meshes M=(K,V,D,S) with respect to the original mesh $\underline{M}$. This energy metric has the following form:

$$E(M)=E_{dist}(M)+E_{spring}(M)+E_{scalar}(M)+E_{disc}(M) \qquad (12)$$

The first two terms, $E_{dist}(M)$ and $E_{spring}(M)$ are identical to terms of an energy metric for geometry preservation used in the mesh optimization method described in Hoppe93. The next two terms, $E_{scalar}(M)$ and $E_{disc}(M)$, of E(M) preserve attributes associated with M other than geometry alone. As described more fully below, the term $E_{scalar}(M)$ measures the accuracy of the scalar attributes of the simplified mesh M, while the term $E_{disc}(M)$ measures the geometric accuracy of the discontinuity curves (defined below and illustrated with yellow lines in FIGS. 8(a–c), 10(a–e), 23(a,d), 24(a–d) and 25(a–c)) of the simplified mesh $\underline{M}$.

The PM construction method 380 performs mesh simplification by modifying the mesh M starting from M while minimizing the energy metric, E(M). More specifically, the method applies minimization of the energy metric to select successive modifications, i.e., edge collapse transformations, to simplify the mesh to a base mesh $M^0$ while best preserving the mesh's appearance. The base mesh $M^0$ together with a sequence of vertex split transformations which is the inverse of the simplifying succession of edge collapse transformations becomes the PM representation of the original mesh $\underline{M}$.

The method 380 begins at step 382 with calculating an estimated energy cost ΔE according to the energy metric E(M) of a set of all candidate edge collapse transformations. Edge collapse transformations of the edges of the mesh M must meet some local conditions to be included in the set of candidate edge collapse transformations In the illustrated method 380, these local conditions include a maximum dihedral angle restriction and a manifold preservation restriction as described in Hoppe93. The maximum dihedral angle restriction disallows any edge collapse transformation if the maximum dihedral angle of edges in the neighborhood after an edge collapse exceeds a threshold angle (a cos (−⅓)=109.471 degrees in the illustrate method) so as to avoid surface self-intersections. For each candidate edge collapse K→K', the method 380 calculates its cost $\Delta E = E_{K'} - E_K$ by solving a continuous optimization $$E_{K'} = \min_{V,S} E_{disc}(V) + E_{spring}(V) + E_{scalar}(V,S) + E_{disc}(V) \qquad (13)$$

over both the vertex positions V and the scalar attributes S of the mesh with connectivity K'.

At step 383, the candidate edge collapse transformations are then organized into a priority queue in ascending order of their estimated energy cost ΔE (i.e., the edge collapse transformation with the lowest estimated energy cost ΔE is placed first in order of priority in the priority queue).

The method 380 simplifies the mesh $\underline{M}$ into the base mesh $M^0$ having a resolution or level of detail selected at step 384, i.e. to within ±1 of a selected number of faces for the base mesh $M^0$. This number can be selected by the computer user using a user interface control (e.g., a numeral entry box, scroll bar or like sliding control, etc.) which is provided by the software application implementing the method 380. Alternatively, the software application can set the number of faces. In the illustrated method 380, the selected number of faces cannot be less than a minimum number of faces for meshes of the same topological type as the original arbitrary mesh $\underline{M}$.

The method 380 then repeats a loop of steps 385–389 until the mesh has been simplified to the number of faces selected in step 384 or there are no more candidate edge collapses In each iteration of the loop, the method 380 first applies the highest priority edge collapse transformation (ecol({$v_s,v_t$})) in the priority queue to the mesh M at step 385. At step 386, the method 380 stores the vertex split transformation vsplit ($v_s,v_l,v_r,v_t$,A) which is the inverse of the edge collapse transformation performed at step 385. (The set of the vertex split transformations stored at step 386 are later encoded in reverse order at step 390 as the sequence of vertex split records 134 (FIG. 7) in the PM representation.)

At step 387, the method 380 compares the number of faces in the mesh M resulting from the edge collapse transformation to the number of faces selected for the base mesh $M^0$. As long as the number of faces in M is greater than the selected number of faces of the base mesh $M^0$ and there remain candidate edge collapse transformations in the priority queue, the method 380 continues iterating through the loop of steps 385–389. Otherwise, the method 380 exits the loop.

If continuing another iteration of the loop, the method 380 at step 388 recalculates the energy cost ΔE of all candidate edge collapse transformations in the neighborhood of the edge collapse transformation performed at step 385 in the current iteration of the loop. For example, if the edge collapse transformation 110 of FIG. 6 is performed at step 385, the method 380 recalculates the estimated energy cost ΔE of all candidate edge collapse transformations in the priority queue for the edges of faces 102'–107'. The method 380 then reorders these edge collapse transformations in the priority queue according to their newly calculated energy cost ΔE. With the reordered priority queue, the method 380 repeats the loop 385–389.

After exiting the loop at step 387 when the mesh M has been reduced to the selected number of faces, the method has produced a continuous resolution family of meshes consisting of the base mesh $M^0$ (e.g., the mesh M resulting from the sequence of edge collapse transformations performed at step 385 in the loop) and a sequence of progressive meshes defined by the stored vertex split operations At step 390, the method 380 encodes the base mesh $M^0$ and the sequence of stored vertex split transformations to form the PM representation 130 as discussed above.

In an alternative variation of the method 380, the step 384 of selecting the number of faces of the base mesh is omitted. Instead, the loop of steps 385–389 is simply repeated until the priority queue contains no more legal edge collapse transformations at the comparison step 387. The mesh M is thus reduced to its simplest form (within the conditions imposed on candidate edge collapse transformations as described above for step 382).

Figure 20:
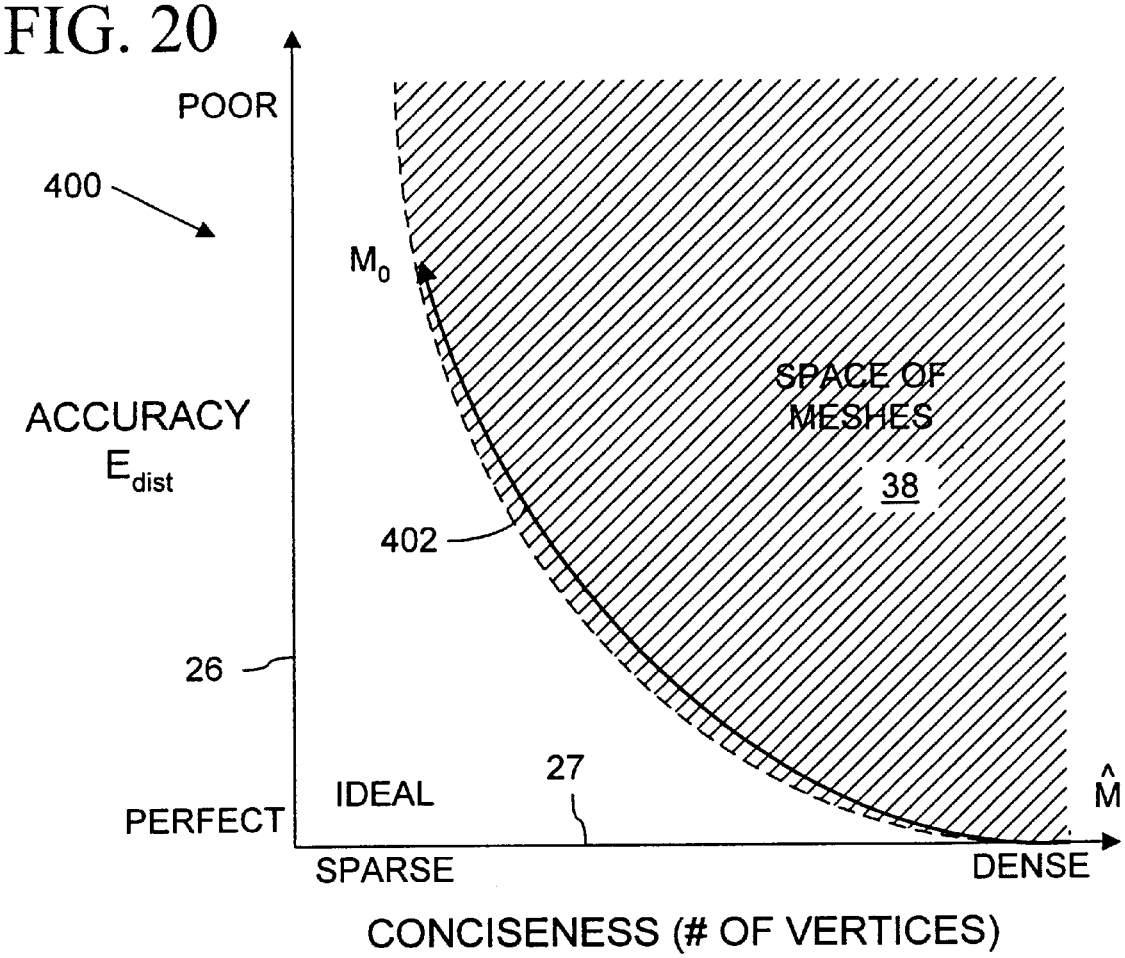
FIG. 20 is a graph of accuracy versus conciseness illustrating the results of the mesh simplification method shown in FIG. 19.

With reference to FIG. 20, in comparison to the mesh optimization method described in Hoppe93 (discussed in the "Background and Summary of the Invention" above), the illustrated PM construction method 380 has a number of advantages for mesh simplification. A key difference is that the illustrated PM construction method 380 utilizes the edge collapse transformation alone to simplify the arbitrary mesh. (The mesh optimization method described in Hoppe93 utilizes a set of three possible mesh transformations, edge collapse, edge split, and edge swap, selected at random.) Considering only edge collapses simplifies the implementation and improves performance of the illustrated PM construction method 380, but more importantly gives rise to the illustrated PM representation 130 (FIG. 7).

As demonstrated by an accuracy versus conciseness graph 400, another key difference is the priority queue utilized in the illustrated PM construction method 380 for selecting the edge collapse transformations that are applied to the successive level-of-detail approximations. This allows the illustrated PM construction method 380 to produce better approximations to the original mesh $\underline{M}$ at levels-of-detail intermediate the original mesh $\underline{M}$ and the base mesh $M^0$ (e.g., along a path 402). By contrast, the mesh optimization scheme described in Hoppe93 randomly attempts successive mesh transformations, and usually achieves poorer approximations along the paths 34–36 (FIG. 2).

As a further consequence of the priority queue selection in the illustrated PM construction method 380, the need for the representation constant $c_{rep}$ (as well as the representation energy term $E_{rep}$ (M) is eliminated. As described in the "Background and Summary of the Invention" above, varying the value of the representation constant crop permits a rough selection of the resolution of the approximating mesh (e.g., meshes $M_b$–$M_d$ of FIG. 2 and exemplary meshes shown in FIGS. 1(b–d)) produced by the mesh optimization method described in Hoppe93. The illustrated PM construction method 380 instead allows the resolution of the base mesh $M^0$ to be explicitly selected (to within ±1 faces). Additionally, as opposed to the single mesh $M_b$, $M_c$, or $M_d$ (FIG. 2) produced by the Hoppe93 mesh optimization per selected value of the representation constant $c_{rep}$, the illustrated PM construction method 380 produces a continuous-resolution family of meshes per run.

Referring again to FIGS. 8(a–d) for example, the meshes shown in FIGS. 8(a–d) are examples of a few out of a continuous resolution family of meshes in a PM representation produced by the illustrated PM construction method 380 (FIG. 19) to approximate the example original arbitrary mesh $\underline{M}$ (FIG. 1(a)). By contrast, the Hoppe93 mesh optimization produces a single one of the exemplary meshes shown in FIGS. 1(b–d) to approximate the mesh $\underline{M}$ (FIG. 1(a)) per run of the method for a selected value of the representation constant $c_{rep}$.

Preserving surface geometry

Referring again to FIG. 19, when calculating the estimated energy cost ΔE at steps 382 and 388, the illustrated PM construction method 380 records the geometry of the original mesh $\underline{M}$ by sampling from it a set of points X. At a minimum, the illustrated PM construction method 380 samples a point at each vertex of $\underline{M}$. The software application implementing the Illustrated method 380 also includes an additional user option which, if selected by the user, samples additional points randomly over the surface of $\underline{M}$.

After sampling the set of points X, the method 380 evaluates terms of the estimated energy cost in expression (13) above. The energy terms $E_{dist}$(M) and $E_{spring}$(M) in that expression are defined as described in Hoppe93 and discussed in the "Background and Summary of the Invention" above. For a mesh of fixed connectivity, the illustrated method 380 for optimizing the vertex positions to minimize $E_{dist}$(V)+$E_{spring}$(V) closely follows that described in Hoppe93. Evaluating $E_{dist}$(V) involves computing the distance of each point $x_i$ in the set of points X to the mesh M. Each of these distances is itself a minimization problem $$d^2(x_i, \Phi_v(|K|)) = \min_{b_i \in |K|} \|x_i - \Phi_v(b_i)\|^2 \quad (14)$$

where the unknown $b_i$ is the parameterization of the projection of $x_i$ on the mesh. In the illustrated method 380, the nonlinear minimization of $E_{dist}$(V)+$E_{spring}$(V) is performed using an iterative procedure alternating between two steps. In the first step, for fixed vertex positions V, the method 380 computes the optimal parametrizations B={$b_1$, . . . ,$b_{|x|}$} by projecting the points X onto the mesh. In the second step, for fixed parametrizations B, the method 380 computes the optimal vertex positions V by solving a sparse linear least-squares problem.

When considering ecol ({$v_s$,$v_t$}), the illustrated method 380 optimizes only one vertex position, $v_s^i$, by performing three different optimizations with different starting points, i.e., $$v_{si}^i = (1-\alpha)v_{si}^{i+1} + (\alpha)v_{m0+i+1}^{i+1} \quad (15)$$

for α={0,1/2,1}, and accepts the best one.

Unlike the mesh optimization method described in Hoppe93 which defines a global spring constant κ for $E_{spring}$, the illustrated method 380 adapts κ each time an edge collapse transformation is considered. Intuitively, the spring energy is most important when few points project onto a neighborhood of faces, since in this case finding the vertex positions minimizing $E_{dist}$(V) may be an under-constrained problem. Thus, for each edge collapse transformation considered, the method 380 sets κ as a function of the ratio of the number of points to the number of faces in the edge collapse transformation's neighborhood. As illustrated in FIG. 6, the neighborhood of an edge collapse transformation 110 is the set of faces 100–107. Using C notation, the method 380 sets κ=r<4?10$^{-2}$:r<8?10$^{-4}$:10$^{-8}$ where r is the ratio of the number of points to faces in the neighborhood.

With this adaptive scheme, the influence of $E_{spring}(M)$ decreases gradually and adaptively as the mesh is simplified, and the expensive schedule of decreasing spring constants used in the mesh optimization method described in Hoppe93 is no longer needed.

Preserving scalar attributes (Escaiar)

As described in the discussion of triangle meshes in the "Background and Summary of the Invention" above, piecewise continuous scalar fields are represented in the illustrated embodiment by defining scalar attributes S at the mesh corners. More specifically, the original mesh $\underline{M}$ generally has at each vertex $v_j$ not only a position $v_j \in R^3$ but also a scalar attribute $\underline{v}_j \in R^d$. In addition to preserving the geometry of the original mesh $\underline{M}$, the estimated energy cost function used in the illustrated PM construction method 380 additionally operates to preserve these scalar attributes of the original mesh $\underline{M}$ in the progressive meshes that the method 380 constructs.

Optimizing scalar attributes at vertices.

To capture scalar attributes of the original mesh $\underline{M}$, the illustrated PM construction method 380 also samples at each point $x_i \in X$ the attribute value $\underline{x}_i \in R^d$. The estimated energy cost expression (13) above is then generalized from the geometric energy terms expression, $E_{dist}(V)+E_{spring}(V)$, just described to also measure the deviation of the sampled attribute values $\underline{X}=\{\underline{x}_1, \ldots, \underline{x}_{|X|}\}$ from those of the mesh M. The geometric energy cost expression, $E_{dist}(V)+E_{spring}(V)$, can be generalized in at least two ways to measure scalar attribute value deviation.

A first alternative generalization is to redefine the distance metric (i.e., energy term $E_{dist}$) itself to measure distance in $R^{3+d}$, e.g.,:

$$d^2((x_i,\underline{x}_i),M(K, V, \underline{V}))=\min_{b_i \in |K|}\|(x_i,\underline{x}_i)-(\Phi_v(b_i)\Phi_{\underline{v}}(b_i))\|^2 \quad (16)$$

This new distance metric can then be minimized using the same iterative approach described above and used in the illustrated method 380. However, this minimization would be computationally expensive since finding the optimal parameterization $b_i$ of each point $x_i$ would require projection in $R^{3+d}$, and would not be completely intuitive since these parametrizations are not geometrically based.

A second alternative generalization of the geometric energy cost expression, $E_{dist}(V)+E_{spring}(V)$ for the estimated energy cost expression (13) in the illustrated method 380 utilizes a separate energy term, $E_{scalar}$, to measure deviation of scalar attributes. In this second alternative generalization, the energy term $E_{dist}(V)$ is evaluated by minimizing the expression (14) as discussed above (i.e., the parametrizations $b_i$ are determined using only geometry). The separate energy term, $E_{scalar}$, in the estimated energy cost expression (13) measures attribute deviation based on these parametrizations:

$$E_{scalar}(\underline{V})=(C_{scalar})^2 \Sigma_i \|\underline{x}_i - \emptyset(b_i)\|^2 \quad (17)$$

where the constant cscaiar assigns a relative weight between the attribute errors ($E_{scalar}$) and the geometric errors ($E_{dist}$). The constant $C_{scalar}$ can be set by the software application, or varied by the computer user with a user interface control supplied by the software application.

Thus, to minimize E $(V,\underline{V})=E_{dist}(V)+E_{spring}(V)+E_{scalar}(\underline{V})$, the illustrated method 380 first finds the vertex position v. minimizing $E_{dist}(V)+E_{spring}(V)$ by alternately projecting the points onto the mesh (obtaining the parametrizations $b_i$) and solving a linear least-squares problem. Then, using those same parametrizations $b_i$, it finds the vertex attribute $\underline{v}_s$ minimizing $E_{scalar}$ by solving a single linear least-squares problem. This has negligible performance overhead as compared to the first alternative generalization.

Figure 21A:
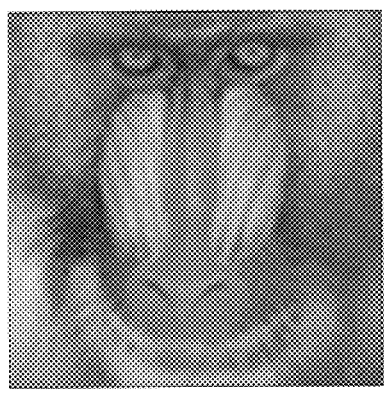
FIGS. 21(a–c) are views of a simplified mesh (FIGS. 21(b–c)) produced from an exemplary arbitrary mesh (FIGS. 21(a)—a mesh with regular connectivity whose vertex colors correspond to the pixels of an image) according to the simplification method of FIG. 19 and illustrating preservation of a complex scalar attribute field (i.e., color).
Figure 21B:
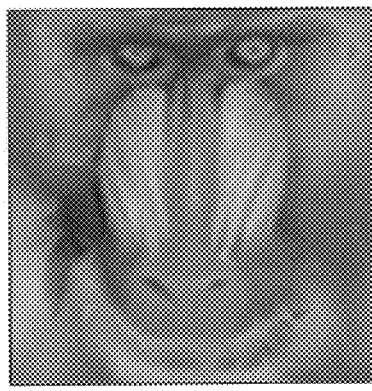
Figure 21C:
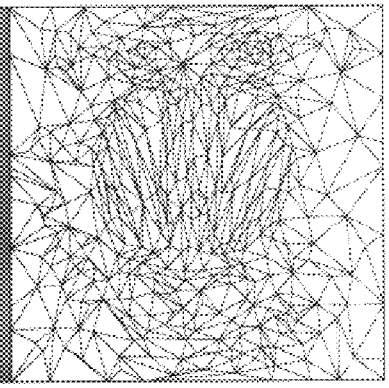

With reference to FIGS. 21(a–c) and 22(a–c), by letting $\Delta E_{scalar}$ contribute to the estimated cost $\Delta E$ of an edge collapse, the illustrated PM construction method 380 obtains simplified meshes whose faces naturally adapt to the attribute fields. For example, by minimizing $\Delta E_{scalar}$, the method 380 (FIG. 19) is able to select edge collapses that preserve a complex scalar attribute field (i.e., color) of an original mesh 420 (FIG. 21(a)) having trivial geometry (a square) in producing a simplified mesh 422 (FIGS. 21(b–c)). In this example, the 200×200 vertices of the original mesh 420 are reduced by the method 380 to just 400 vertices in the simplified mesh 422 while retaining much of the color quality.

Figure 22A:
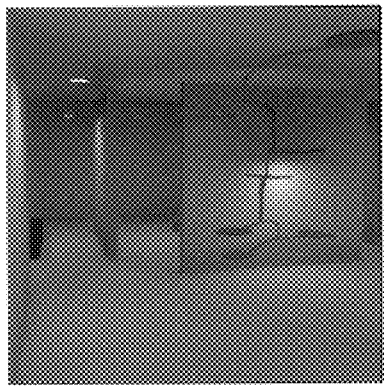
FIGS. 22(a–c) are views of a simplified mesh (FIGS. 22(b–c)) with 10,000 faces produced from an exemplary arbitrary mesh (FIG. 22(a)) with 150,983 faces according to the simplification method of FIG. 19 illustrating preservation of a scalar attribute (radiosity).
Figure 22B:
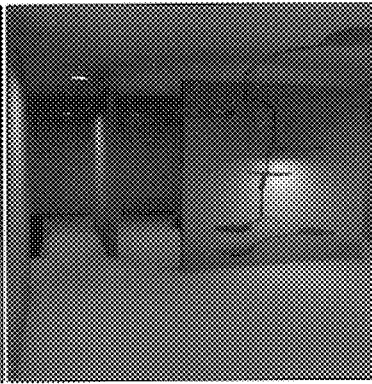
Figure 22C:
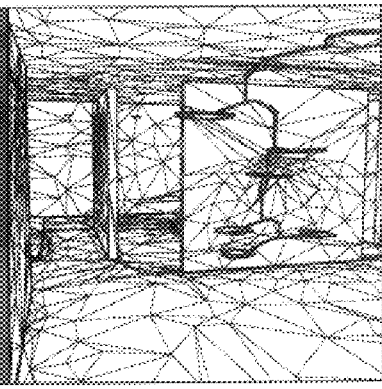

As another example, the method 380 selects edge collapses to preserve another scalar attribute, radiosity, of another original mesh 430 (FIG. 22(a)) having 150,983 faces to produce a simplified mesh 432 (FIG. 22(b–c)) having 10,000 faces.

Optimizing scalar attributes at corners.

The above described minimization of $\Delta E_{scalar}$ is also utilized by the illustrated PM construction method 380 when optimizing the scalar corner attributes S. At each vertex $v_j$, instead of solving for a single unknown attribute value $\underline{v}_j$, the illustrated method 380 partitions the corners into continuous sets (based on equivalence of corner attributes) and for each continuous set solves independently for its optimal attribute value.

Range constraints

The illustrated method 380 also accounts for scalar attributes having constrained ranges. For instance, the components (r,g,b) of color are typically constrained to lie in a range between 0 and 1. The least-squares minimization of $\Delta E_{scalar}$ may yield color values outside this range. In cases where scalar attributes have constrained ranges, the illustrated method 380 clips the optimized values to the given range. For least-squares minimization of a Euclidean norm, this is in fact optimal.

Normals

Surface normals $(n_x,n_y,n_z)$ are typically constrained to have unit length, and thus their domain is non-Cartesian. Optimizing over normals would therefore require minimization of a nonlinear functional with nonlinear constraints. The illustrated method 380 instead simply carries the normals through the simplification process. Specifically, the method 380 computes the new normals at vertex $v_{si}^i$ by interpolating between the normals at vertices $v_{si}^{i+1}$ and $v_{m0+i+1}^{i+1}$ using the α value that resulted in the best vertex position $v_{si}^i$ in minimizing the geometry energy term $\Delta E_{dist}$ as described above. Fortunately, the absolute directions of normals are less visually important than their discontinuities, which are preserved by the estimated energy cost expression in the illustrated method 380, as described below.

Preserving discontinuity curves ($E_{disc}$)

Appearance attributes give rise to a set of discontinuity curves on the mesh, both from differences between discrete face attributes (e.g., material boundaries), and from differences between scalar corner attributes (e.g., creases and shadow boundaries). More specifically, the attributes D and S give rise to discontinuities in the visual appearance of the mesh. An edge $\{v_j,v_k\}$ of the mesh is said to be sharp if either (1) it is a boundary edge; (2) its two adjacent faces $f_1$ and $f_2$ have different discrete attributes (i.e., $d_{f1} \ne d_{f2}$), or (3) its adjacent corners have different scalar attributes (i.e., $s_{(vj,f1)} \ne s_{(vj,f2)}$ or $s_{(vk,f1)} \ne s_{(vk,f2)}$). Together, the set of sharp edges define a set of discontinuity curves over the mesh (e.g., the yellow curves in FIGS. 8(a–d)). As these discontinuity curves form highly noticeable features, it is important to preserve them both topologically and geometrically.

The illustrated PM construction method 380 detects when a candidate edge collapse transformation would modify the topology of the discontinuity curves by testing some local conditions. Specifically, let sharp $\{v_j,v_k\}$ denote that an edge $\{v_j,v_k\}$ is sharp, and let #sharp$\{v_j\}$ be the number of sharp edges adjacent to a vertex $v_j$. Then, referring to FIG. 6, the edge collapse transformation 110 of an edge $\{v_s,v_t\}$ 92 modifies the topology of discontinuity curves if either: (1) sharp$\{v_s,v_1\}$ and sharp$\{v_t,v_1\}$, or sharp$\{v_s,v_2\}$ and sharp$\{v_t,v_2\}$, or (2) #sharp$\{v_s\} \ge 1$ and #sharp$\{v_t\} \ge 1$ and not sharp$\{v_s,v_t\}$, or (3) #sharp$\{v_s\} \ge 3$ and #sharp$\{v_t\} \ge 3$ and sharp$\{v_s,v_t\}$, or (4) sharp$\{v_s,v_t\}$ and #sharp$\{v_s\}=1$ and #sharp$\{v_t\} \ne 2$, or (5) sharp$\{v_s,v_t\}$ and #sharp$\{v_t\}=1$ and #sharp$\{v_s\} \ne 2$.

A number of different strategies can be employed in the PM construction method 380 to preserve discontinuity curves using the above described tests. One alternative strategy (hereafter referred to as the fixed discontinuity curve strategy) is to simply disallow an edge collapse if these tests show that the edge collapse would modify the topology of discontinuity curves. A more sophisticated alternative strategy which permits, buts penalizes changes to discontinuity curve topology is presented below.

To also preserve the geometry of the discontinuity curves, the illustrated method 380 further samples an additional set of points Xdisc from the sharp edges of M, and defines an additional energy term $E_{disc}$ in the estimated energy cost expression (13) equal to the total squared distances of each of these points to the discontinuity curve from which it was sampled. In other words, $E_{disc}$ is defined just like $E_{dist}$, except that the points $X_{disc}$ are constrained to project onto a set of sharp edges in the mesh. In effect, the method 380 solves a curve fitting problem embedded within the overall surface fitting problem. Since all boundaries of the surface are defined to be discontinuity curves, our procedure preserves boundary geometry more accurately than Hoppe93.

Figures 23A, 23B, 23C, 23D:
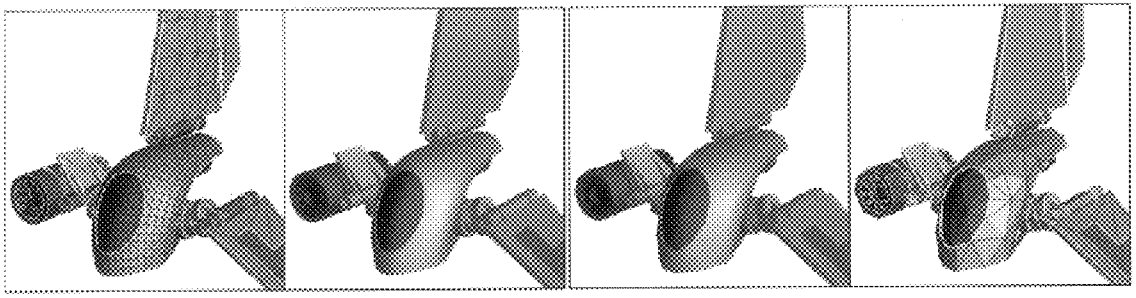
FIGS. 23(a–d) are views of a simplified mesh (FIGS. 23(c–d)) with 3,000 faces produced from an original arbitrary mesh (FIGS. 23(a–b)) with 19,458 faces according to the simplification method of FIG. 19 illustrating preservation of overall appearance (including both geometry and attributes).

Referring to FIGS. 23(a–c), the benefit of employing the additional Edis, energy term in the energy cost expression (13) is demonstrated by the simplified meshes 440 (FIG. 23(a)), and 442 (FIG. 23(b)). Both meshes 440 and 442 were simplified to 2000 faces, only the mesh 440 was simplified without the $E_{disc}$ energy term in the energy cost expression (13) whereas the mesh 442 was simplified with the $E_{disc}$ energy term. As a result, the mesh 442 is a much better approximation visually of the original mesh than the mesh 440 due to discontinuity curve preservation. This is particularly apparent with respect to the topology of the discontinuity curves defining the windows in the model. Some of the discontinuity curves of the mesh are indicated with yellow lines in FIGS. 23(a–c).

Permitting changes to topology of discontinuity curves.

Referring still to FIGS. 23(a–c), some meshes contain numerous discontinuity curves, and these curves may delimit features that are too small to be interesting when viewed from a distance. In such cases, strictly preserving the topology of the discontinuity curves unnecessarily curtails simplification. In an alternative strategy for preserving discontinuity curves, the PM construction method 380 permits changes to the topology of the discontinuity curves, but penalizes such changes When a candidate edge collapse ecol ($\{v_s,v_t\}$) changes the topology of the discontinuity curves of the mesh, the method 380 adds to its estimated energy cost $\Delta E$ the value $$|X_{disc,\{vs,vt\}}| \cdot \|v_s - v_t\|^2 \qquad (18)$$

where $|X_{disc,\{vs,vt\}}|$ is the number of points of $X_{disc}$ currently projecting onto $\{v_s,v_t\}$.

That simple strategy, although ad hoc, has proven very effective. To illustrate, mesh 442 (FIG. 23(b)) was simplified by the method 380 using the fixed discontinuity curve preservation strategy to 2000 faces, while mesh 444 (FIG. 23(c)) was simplified to 2000 faces by the preservation strategy which only penalizes changes to discontinuity curves. With the strategy allowing discontinuity curve changes, the thin dark gray window frames are allowed to vanish in the mesh 444. In the mesh 442, however, the fixed discontinuity curve preservation strategy forces the window frames to stay, resulting in a poorer quality simplified mesh.

The illustrated PM construction method 380 (FIG. 19) is one of many possible PM construction methods with varying trade-offs of speed and accuracy. A much simpler alternative PM construction method is to select legal edge collapse transformations at random. (Some local conditions must be satisfied for an edge collapse to be legal, i.e., manifold preserving described in Hoppe93.) While crude, this scheme has the advantage of being very fast. Unfortunately, this method generally provides poorer low level-of-detail approximations (i.e., the progressive meshes $M^i$ closest to the base mesh $M^0$ in the progressive mesh sequence) to the original arbitrary mesh M̲.

A less crude alternative PM construction method uses a simple heuristic, such as the "distance to plane" metric described in Schroeder-etal92, as a basis for improving the edge collapse selection strategy.

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. A method of representing a three-dimensional geometric object with polygonal meshes at varying levels of detail for computer graphics, comprising the steps of:

specifying a base polygonal mesh having a plurality of vertices and a plurality of faces that approximates the three-dimensional geometric object at a coarse level of detail; and specifying a sequence of sets of mesh refinement transformations which, when applied successively to the base polygonal mesh, produce a succession of polygonal meshes that approximate the three-dimensional geometric object at progressively finer levels of detail, the sets of mesh refinement transformations being complete.

2. The method of claim 1 wherein at least one of the sets of mesh refinement transformations is a vertex split transformation which, when applied to a preceding polygonal mesh in the succession, splits an ancestor vertex of the preceding polygonal mesh into two descendent vertices to produce a next polygonal mesh in the succession such that the next polygonal mesh has one more vertex and from one to two more faces than the preceding polygonal mesh.

3. The method of claim 2 wherein the step of specifying the base polygonal mesh comprises the steps of:
    specifying a set of vertices; and
    specifying a set of faces, where the vertices and the faces define the base polygonal mesh.

4. The method of claim 3 wherein the step of specifying the base polygonal mesh further comprises the step of:
    specifying attributes on at least some of the vertices, the faces, edges defined by pairs of the vertices, and corners defined by pairs of one of the vertices with one of the faces.

5. The method of claim 2 wherein the step of specifying the base polygonal mesh comprises the steps of encoding data into a base polygonal mesh record representing a simplicial complex, a set of vertex positions, and a set of attributes; and
    the step of specifying the mesh refinement transformations comprises, for each vertex split transformation, the step of encoding data into a vertex split record specifying an ancestor vertex, a first side vertex, and a second side vertex of a preceding polygonal mesh in the sequence, and geometric positions of the ancestor vertex and a descendent vertex in a next polygonal mesh in the succession.

6. The method of claim 5 wherein the step of encoding data into the vertex split record comprises the step of:
    encoding differences of the geometric positions of the ancestor vertex and the descendent vertex in the next polygonal mesh from the geometric position of the ancestor vertex in the preceding polygonal mesh into the vertex split record to thereby specify the geometric positions of the ancestor vertex and the descendent vertex in the next polygonal mesh.

7. The method of claim 5 wherein the step of encoding data into the vertex split record comprises the steps of:
    assigning vertex indices uniquely to the vertices of the base polygonal mesh and the vertices introduced by the sets of mesh refinement transformations;
    encoding the vertex index assigned to the ancestor vertex into the vertex split record to thereby specify the ancestor vertex;
    assigning adjoining vertex indices uniquely to a set of vertices adjoining the ancestor vertex; and
    encoding the adjoining vertex indices assigned to the first and second side vertices in the vertex split record to thereby specify the first and second side vertices.

8. The method of claim 5 wherein the step of encoding data into the vertex split record comprises the steps of:
    encoding a control bit sequence to indicate a discrete attribute of a face introduced by the vertex split transformation, the control bit sequence having a first value if the discrete attribute is the same as a neighboring face of the preceding mesh and having a second value if the discrete attribute is different.

9. The method of claim 5 wherein the step of encoding data into the vertex split record comprises the steps of:
    encoding a control bit sequence to indicate a scalar attribute of a corner introduced by the vertex split transformation, the control bit sequence having a first value if the scalar attribute is the same as a neighboring corner of the preceding mesh and having a second value if the scalar attribute is different.

10. The method of claim 1 wherein the step of specifying the sequence of sets of mesh refinement transformations comprises, for each vertex split transformation in the sequence, the steps of:
    specifying an ancestor vertex and first and second side vertices out of the vertices of a preceding polygonal mesh in the succession; and
    specifying geometries of two descendent vertices for a next polygonal mesh in the succession, where the ancestor vertex, the first and second side vertices and the geometries of the two descendent vertices define a vertex split transformation that, when applied to the preceding polygonal mesh, splits the ancestor vertex into the two descendent vertices and adds two new faces defined by the combination of the descendent vertices with each of the side vertices, respectively, to produce the next polygonal mesh.

11. The method of claim 10 wherein the step of specifying the sequence of mesh refinement transformations further comprises, for each vertex split transformation in the sequence, the steps of:
    specifying attributes on at least some of the first and second side vertices, the new faces, edges defined by pairs out of the descendent vertices and the first and second side vertices, and corners defined by pairs of one out of the descendent vertices and the first and second side vertices with one of the new faces.

12. The method of claim 1 further comprising:
    applying a subset of the sequence of sets of mesh refinement transformations to the base mesh to form a mesh having a desired level-of-detail.

13. The method of claim 1 further comprising:
    applying a first subset of the sequence of set of mesh refinement transformations to the base mesh to form a coarser mesh having a first desired level-of-detail;
    applying a second subset greater than the first subset of the sequence of set of mesh refinement transformations to the base mesh to form a finer mesh having a second desired level-of-detail greater than the first desired level-of-detail; and
    forming a geomorph between the coarser mesh and the finer mesh.

14. The method of claim 2 further comprising:
    selecting a subset of the sequence of sets of mesh refinement transformations within at least one localized area of the base mesh;
    applying the subset to the base mesh to form a selectively refined mesh.

15. The method of claim 14 wherein the step of selecting the subset comprises selecting sets of the mesh refinement transformations within a view frustum.

16. The method of claim 14 wherein the step of selecting the subset comprises selecting sets of the mesh refinement transformations that are within a view frustum, and are near silhouette edges or near a viewer.

17. The method of claim 1 further comprising the steps of:
    transmitting information from a first computer at a first site to a second computer at a remote site, the information specifying, in order, the base mesh and the sequence of sets of mesh refinement transformations;

receiving the information by the second computer;

displaying a view of a mesh based on the information; and progressively refining the mesh and updating the view as the information of the sequence of sets of mesh refinement transformations is received.

18. The method of claim 17 wherein the step of progressively refining the mesh and updating the view comprises the steps of forming a coarser mesh based on the information of the base mesh and a first subset of the sequence of sets of mesh refinement transformations received at the second computer;

displaying a view of the coarser mesh;

receiving information of a further subset of the sequence of sets of mesh refinement transformations at the second computer;

applying the further subset to the coarser mesh to form a finer mesh;

forming at least one geomorph between the coarser and the finer meshes; and displaying a view of the at least one geomorph.

19. The method of claim 18 further comprising the steps of:

selecting a subset of the sequence of sets of mesh refinement transformations that lie within a frustum of the view being displayed at the second computer for transmission by the first computer.

20. The method of claim 1 further comprising the steps of:

modeling the three dimensional object as an original mesh;

selecting a plurality of edge collapse transformations that simplify the original mesh to a simplified mesh having a desired level-of-detail; and selecting the simplified mesh and a sequence of vertex split transformations which is the inverse of the edge collapse transformations as the base mesh and the sequence of sets of mesh refinement transformations.

21. The method of claim 20 wherein the step of selecting the edge collapse transformations comprises selecting the edge collapse transformations according to an appearance metric for preserving a geometry of the original mesh.

22. The method of claim 21 wherein the appearance metric further preserves scalar attributes associated with the original mesh.

23. The method of claim 22 wherein the appearance metric further preserves discontinuity curves of the original mesh.

24. A computer readable data storage medium having encoded thereon a progressive meshes representation of a multi-dimensional object for computer graphics, the progressive meshes representation comprising:

a base mesh record for specifying a base mesh representative of the object at a lowest level of detail; and a plurality of vertex split records for specifying a plurality of vertex split transformations which, when applied successively to the base mesh, yield a succession of meshes representative of the object and having progressively higher levels of detail.

25. The computer readable data storage medium of claim 24 wherein each of the vertex split records comprises:

vertex identifiers for specifying a split vertex and two side vertices of the vertex split transformation; and vertex position identifiers for specifying position coordinates of two resultant vertices of the vertex split transformation.

26. The computer readable data storage medium of claim 25 wherein the vertex identifiers are encoded according to a predictive encoding scheme.

27. The computer readable data storage medium of claim 25 wherein the vertex position identifiers are encoded according to a variable-length delta encoding scheme.

28. The computer readable data storage medium of claim 24 wherein each of the vertex split records comprises:

attribute values for specifying attributes associated with faces and corners introduced by the vertex split transformation.

29. The computer readable data storage medium of claim 28 wherein the attribute values are encoded according to a predictive encoding scheme.

30. A method of losslessly encoding an arbitrary initial mesh at progressive levels of detail for rendering computer graphics views of a multi-dimensional geometric object, comprising:

encoding a base mesh record specifying a set of position coordinates and a connectivity of vertices of a base mesh, the position coordinates and connectivity of the vertices defining a plurality of faces having edges between adjacent vertices and corners at the vertices; and encoding a plurality of vertex split records specifying a split vertex identifier, two side vertex identifiers, and two resulting vertex position coordinates for each of a sequence of vertex split transformations that yield a succession of meshes at progressively increasing levels of detail and exactly reproduce the arbitrary initial mesh when applied in sequence to the succession beginning with the base mesh, each vertex split transformation introducing a new vertex and at least one new face having edges between adjacent vertices and corners at the vertices to a current mesh in the succession to yield a next mesh in the succession.

31. The method of claim 30 comprising for each of the vertex split records:

encoding the two resulting vertex positions in the vertex split record as differences between the two resulting vertex positions and a vertex position of a split vertex specified by the split vertex identifier.

32. The method of claim 31 comprising:

encoding the differences according to a variable length encoding scheme.

33. The method of claim 30 comprising:

encoding the two resulting vertex positions in the vertex split record as a choice of a starting position of a split vertex specified by the split vertex identifier and differences in position between the two resulting vertex positions and the starting position, where the choice of the starting position is from a group consisting of a first of the two resulting vertex positions, a second of the two resulting vertex positions, and a mid-point between the two resulting vertex positions.

34. The method of claim 33 comprising:

encoding the differences according to at least one variable length encoding scheme.

35. The method of claim 30 comprising:

encoding the two resulting vertex positions in the vertex split record as a choice of a split vertex position and a single position difference, where the choice of the split vertex position is from a group consisting of a first of the two resulting vertex positions, a second of the two resulting vertex positions, and a mid-point between the two resulting vertex positions, and where the single position difference is a difference between the split vertex position and one of the two resulting vertex positions other than the split vertex position.

36. The method of claim 35 comprising:

encoding the single position difference according to a variable length encoding scheme.

37. The method of claim 30 comprising:

encoding the two side vertex identifiers as adjacent vertex indices specifying two side vertices out of a plurality of vertices adjacent to a split vertex specified by the split vertex identifier.

38. The method of claim 30 comprising:

encoding discrete attribute values into the base mesh record specifying discrete attributes associated with the faces; and encoding a discrete attribute value into each vertex split record specifying a discrete attribute associated with the at least one new face introduced by the vertex split transformation of the vertex split record according to a predictive encoding scheme in which a first value specifies the discrete attribute being equal to that of an adjacent face and a second value specifies the discrete attribute being different from any adjacent face.

39. The method of claim 30 comprising:

encoding scalar attribute values into the base mesh record specifying scalar attributes associated with the corners; and encoding a scalar attribute value into each vertex split record specifying a scalar attribute associated with a corner of the at least one new face introduced by the vertex split transformation of the vertex split record according to a predictive encoding scheme in which a first value specifies the scalar attribute being equal to that of an adjacent corner and a second value specifies the scalar attribute being different from any adjacent corner.

40. The method of claim 39 comprising:

encoding the scalar attribute value according to the predictive encoding scheme in which a difference value accompanying the second value specifies a difference in the scalar attribute between the corner of the at least one new face and the adjacent corner.

41. The method of claim 40 comprising:

encoding the difference in the scalar attribute according to a variable length encoding scheme.

42. A method of progressively transmitting a level-of-detail representation of an object from a remote site for displaying computer graphics views of the object at a computer, comprising:

transmitting a base mesh record from the remote site defining a base mesh representing the object at a low level of detail;

transmitting a stream of mesh refinement records from the remote site defining a sequence of mesh transformations for refining the base mesh into an arbitrary mesh representing the object at a high level of detail, the mesh transformations being complete;

receiving the base mesh record at a computer;

constructing a progressive resolution mesh at the computer from the base mesh record;

rendering and displaying at the computer a first computer graphics view of the object having a lower level of detail based on the progressive resolution mesh;

receiving an increment of the stream of mesh refinement records at the computer;

refining the progressive resolution mesh to a higher level of detail at the computer by applying the mesh transformations defined by the mesh refinement records of the increment; and rendering and displaying at the computer a second computer graphics view of the object having the higher level of detail based on the progressive resolution mesh.

43. The method of claim 42 comprising:

constructing a geomorph for interpolating between the progressive resolution mesh at the lower level of detail and the progressive resolution mesh at the higher level of detail as a function of a blend parameter;

evaluating the geomorph at a sequence of intermediate values of the blend parameter that create a transition of the geomorph from the progressive resolution mesh at the lower level of detail to the progressive resolution mesh at the higher level of detail; and rendering and displaying at the computer a sequence of computer graphics views of the object based on the geomorph evaluated at the sequence of intermediate values.

44. The method of claim 42 comprising:

storing the mesh refinement records of the stream into an input buffer at the computer as the mesh refinement records are received;

for each of a plurality of successive increments of the stream of mesh transformation records, performing the steps of:

retrieving mesh transformation records for a next increment of the stream from the input buffer for refining the progressive resolution mesh to a next higher level of detail; and when the step of retrieving the mesh transformations temporarily empties the input buffer, updating the progressive resolution mesh and the computer graphics view being displayed based on the progressive resolution mesh with that next increment of the stream.

45. The method of claim 42 comprising:

performing the steps, for each of a plurality of further successive increments of the stream of mesh transformation records that produce respective further computer graphics views of the object at exponentially increasing levels of detail, of:

receiving the further increment of the stream of mesh refinement records at the computer;

refining the progressive resolution mesh to a next higher exponentially increasing level of detail at the computer by applying the mesh transformations defined by the mesh refinement records of the further increment; and rendering and displaying at the computer the respective further computer graphics view of the object having the next higher exponentially increasing level of detail based on the progressive resolution mesh as refined by applying the further increment.

46. The method of claim 42 wherein the mesh refinement transformations are vertex split transformations.

47. The method of claim 46 comprising:

displaying a computer graphics view of a different portion of the object; and selecting a subset of the mesh refinement records of the progressive resolution meshes representation for transmitting in the stream where each mesh refinement record in the subset has not already been transmitted in the stream and defines a mesh refinement transformation relating to refinement of the progressive resolution mesh in the different portion of the object.

48. The method of claim 42 comprising:

storing a progressive resolution meshes representation of the object at the remote site, the progressive resolution meshes representation comprising the base mesh record and a sequence of mesh refinement records;

displaying a computer graphics view of a portion of the object based on the progressive resolution mesh; and selecting a subset of the mesh refinement records of the progressive resolution meshes representation for transmitting in the stream where each mesh refinement record in the subset defines a mesh refinement transformation relating to refinement of the progressive resolution mesh in the portion of the object.

49. A system for progressively transmitting a level-of detail representation of an object from a remote site for displaying computer graphics views of the object at a computer, comprising:

a memory at the remote site for storing a progressive resolution meshes representation of the object comprising a base mesh record and a sequence of vertex split records, the base mesh record defining a base mesh representative of the object at a low level of detail, the sequence of vertex split records defining vertex split transformations that applied successively to the base mesh refine the base mesh into an arbitrary mesh representative of the object at a high level of detail;

a data transmitter at the remote site for transmitting the base mesh record and a stream of the vertex split records to the computer.

50. The system of claim 49 comprising:

a selective refinement transmission processor at the remote site for selecting a subset of the vertex split records of the progressive resolution meshes representation for transmitting in the stream where each vertex split record in the subset defines a vertex split transformation relating to refinement within a portion of the object.

51. The system of claim 50 wherein the portion of the object is dependent on the computer graphics view being displayed at the computer.

52. The system of claim 51 comprising:

the selective refinement transmission processor being responsive to the computer graphics view changing to a different portion of the object for selecting a further subset of the vertex split records of the progressive resolution meshes for transmitting in the stream where each vertex split record in the further subset has not already been transmitted in the stream and defines a vertex split transformation relating to refinement of the progressive resolution mesh in the different portion of the object.

53. The system of claim 49 further comprising:

the computer for displaying the computer graphics views of the object;

a data receiver in the computer and in communication with the data transmitter of the remote site for receiving the base mesh records and the stream of vertex split records;

a progressive resolution mesh processor in the computer for constructing a progressive resolution mesh from the base mesh record and for refining the progressive resolution mesh at progressive levels of detail by applying vertex split transformations defined by successive increments of the stream of vertex split records;

a graphics rendering engine in the computer for rendering computer graphics views of the object from the progressive resolution mesh at the progressive levels of detail; and a display driver in the computer for causing the computer to display the computer graphics views of the object.

54. The system of claim 53 comprising:

a geomorph processor in the computer for constructing a geomorph that interpolates between the progressive resolution mesh at a successive two of the progressive levels of detail as a function of a blend parameter, and for evaluating the geomorph at a sequence of intermediate values of the blend parameter that create a transition of the geomorph from the progressive resolution mesh at a lower and at a higher of the successive two of the progressive levels of detail; and the graphics rendering engine rendering a sequence of computer graphics views of the object based on the geomorph evaluated at the sequence of intermediate values.

55. The system of claim 53 comprising:

an input buffer in the computer for storing the mesh refinement records of the stream as the vertex split records are received at the computer;

the progressive resolution mesh processor retrieving a plurality of vertex split records for each of the successive increments of the stream from the input buffer;

the computer shifting from refining the progressive resolution mesh by the progressive resolution mesh processor and rendering the computer graphics views by the graphics engine when the input buffer is emptied from retrieving the vertex split records for a current one of the successive increments of the stream whereby processing is balanced between refining the progressive resolution mesh and rendering the computer graphics views.

* * * * *